(12) United States Patent
Pozzer

(10) Patent No.: US 12,371,216 B2
(45) Date of Patent: Jul. 29, 2025

(54) HORIZONTAL PACKAGING MACHINE WITH ADJUSTABLE CUT-SEW GROUP

(71) Applicant: TECNO PACK S.P.A., Schio (IT)

(72) Inventor: Corrado Pozzer, Schio (IT)

(73) Assignee: TECNO PACK S.P.A., Schio (IT)

( * ) Notice: Subject to any disclaimer, the term of this patent is extended or adjusted under 35 U.S.C. 154(b) by 315 days.

(21) Appl. No.: 18/040,441

(22) PCT Filed: Jun. 25, 2021

(86) PCT No.: PCT/IB2021/055641
§ 371 (c)(1),
(2) Date: Feb. 3, 2023

(87) PCT Pub. No.: WO2022/029520
PCT Pub. Date: Feb. 10, 2022

(65) Prior Publication Data
US 2023/0322427 A1    Oct. 12, 2023

(30) Foreign Application Priority Data
Aug. 6, 2020  (IT) .................. 102020000019420

(51) Int. Cl.
*B65B 59/00* (2006.01)
*B65B 51/30* (2006.01)
(Continued)

(52) U.S. Cl.
CPC .......... *B65B 59/001* (2019.05); *B65B 51/306* (2013.01); *B65B 59/003* (2019.05); *B65B 61/06* (2013.01); *B65B 65/02* (2013.01)

(58) Field of Classification Search
CPC ... B65B 51/306; B65B 59/001; B65B 59/003; B65B 61/06; B65B 65/02
See application file for complete search history.

(56) References Cited

U.S. PATENT DOCUMENTS 2,803,100 A * 8/1957 Aalseth ............... B29C 66/1122
53/550
3,943,686 A * 3/1976 Crawford .............. B29C 66/849
53/550
(Continued)

FOREIGN PATENT DOCUMENTS

EP     1038779 A1 * 9/2000  ............. B29C 65/18
GB     2590432 A  * 6/2021  ............. B29C 65/02
(Continued)

OTHER PUBLICATIONS

WO2018208311A1.*
(Continued)

*Primary Examiner* — Eyamindae C Jallow
(74) *Attorney, Agent, or Firm* — Leason Ellis LLP

(57) ABSTRACT

A horizontal packaging machine (M) for packaging a product (P) fed in a horizontal direction (X) comprises a cut-sew group (22) for making on a packaging film (F) transverse welds and a cut to close and separate from each other two successive packs (C1, C2, C3, C4), wherein the cut-sew group (22) comprises a plurality of cut and sew tools (U1, U2, U3) for making the transverse welds and the cut, wherein the transverse welds define the edges of the packs (C1, C2, C3, C4) according to different packaging sizes for the product (P), wherein the cut-sew group (22) comprises an upper shaft (AS) and a lower shaft (AI) driven in rotation independently by means of a respective upper motor (MS) and a respective lower motor (MI), in which each shaft (AS, AI) mounts on it the plurality of cut and sew tools (U1, U2, U3) and in which each cut and sew tool (U1, U2, U3) is composed of an upper tool (US) and a corresponding lower tool (U1). In particular, the horizontal packaging machine (M) includes compensation means of the mutual distance (MMV, PE, P1, P2, CT, FL) between the two shafts (AS, AI)

(Continued)

with micrometric adjustment of the distance to compensate for thermal expansion and use of packaging film (F) of different thickness.

18 Claims, 22 Drawing Sheets

(51) Int. Cl.
*B65B 61/06* (2006.01)
*B65B 65/02* (2006.01)

(56) References Cited

U.S. PATENT DOCUMENTS

| | | | | |
|---|---|---|---|---|
| 5,548,946 | A * | 8/1996 | Holub | B29C 66/1122 53/550 |
| 5,678,390 | A * | 10/1997 | Pruett | B65B 51/306 53/550 |
| 8,028,503 | B2 * | 10/2011 | Capodieci | B29C 66/83513 156/580.2 |
| 8,499,811 | B2 | 8/2013 | Guidetti | |
| 2008/0028902 | A1 * | 2/2008 | Baggot | B26D 5/086 83/13 |
| 2018/0346171 | A1 * | 12/2018 | Kua | B65B 11/50 |
| 2020/0391888 | A1 * | 12/2020 | Mous | B65B 59/02 |

FOREIGN PATENT DOCUMENTS

| | | | |
|---|---|---|---|
| WO | 0200503 | A1 | 1/2002 |
| WO | WO-2018208311 | A1 * | 11/2018 ............. B26D 1/405 |

OTHER PUBLICATIONS

International Search Report and Written Opinion in corresponding International Patent Application No. PCT/IB2021/055641 mailed Oct. 15, 2021. 14 pages.

International Preliminary Report on Patentability in corresponding International Patent Application No. PCT/IB2021/055641 mailed Nov. 8, 2022. 18 pages.

* cited by examiner

HORIZONTAL PACKAGING MACHINE WITH ADJUSTABLE CUT-SEW GROUP

CROSS-REFERENCE TO RELATED PATENT APPLICATIONS

This application is a U.S. National Stage Application under 35 U.S.C. § 371 of International Patent Application No. PCT/IB2021/055641 filed Jun. 25, 2021, which claims the benefit of priority of Italian Patent Application No. 102020000019420 filed Aug. 6, 2020, both of which are incorporated by reference in their entireties. The International Application was published on Feb. 10, 2022, as International Publication No. WO 2022/029520 A1.

FIELD OF THE INVENTION

The present invention relates in general to a horizontal packaging machine.

More in detail, the present invention relates to a horizontal packaging machine having a cut-sew group (commonly known as a "crimper"), which is height-adjustable, i.e., the mutual position of the two shafts supporting the respective tools (or spatula groups) which cut and weld the product pack to size are adjustable.

PRIOR ART

Flowpack packaging is a type of packaging for food products. Flowpack packaging means a type of plastic packaging made with the aid of a horizontal packaging machine.

In a flowpack horizontal packaging machine, the individual products are transferred and advanced directly within a single packaging film, which is welded in three points: two transverse welds which define the two lateral (or front edge and back edge) edges of the pack and a longitudinal weld to achieve the closing of the pack.

Therefore, the flowpack packaging is made starting from a film that once folded to form a tube is filled with the product (or products) and passes through a cut-sew group which allows the making of the two transverse welds indicated above (the one at the beginning and the one at the end of the pack).

In particular, the longitudinal welding is formed in the lower portion of the pack by means of a series of pairs of heat-sealing wheels positioned upstream of the cut-sew group, the number of which varies according to construction choices.

The final product (i.e. the flowpack) is then obtained by means of two transverse welds, which close the tube pack at the two opposite edges with the product inside and separate the pack made and finished from the next pack being formed.

The packaging film is arranged to form a tunnel to surround and envelope the product to be packaged. The film is formed by a single continuous web wound on a feeding reel and on which the different packs, all of the same size, are made. In particular, the reel is made from a continuous packaging film in which the different packs are printed in an aligned sequence on one side. Normally, the inner side of the packaging film, i.e. the side in contact with the product, is made of a suitable food-grade material.

Each pack will be the same size and display the same information (e.g. product name, manufacturer's logo, list of ingredients, product images, etc.), and the machine is calibrated to divide the packs so that the cuts are made in a predetermined portion in which there is no writing or images, but there could be a possible pattern or a monochromatic portion dedicated to welding and cutting. Therefore, the pack is repeated on the plastic film equal to itself with neutral interludes in which the welds and the cuts are made.

The flowpack packaging machine comprises a welding group, which has a continuous welder (typically located on the lower side in horizontal machines), which welds the two longitudinal ends of the packaging film, and a transverse heat-sealing head (or double head), which simultaneously welds the tail of one pack and the head of the next pack.

In particular, the cut-sew group makes a first weld, which closes the final edge of the pack, i.e. the tail, then makes the cut to separate the pack just made from the next pack being formed, and finally makes the second weld, which makes the initial edge or head of the second pack. In this manner, the individual wrappers are divided into separate packs.

Examples of flowpack (horizontal) packs are the packs frequently used for cakes, snacks, portioned packs of breadsticks, packs of crackers, individually wrapped sandwiches, candy, multiple packs of biscuits, chocolate bars, chocolates, etc.

Currently, the horizontal packaging machines are designed to process a limited series of lengths, i.e. a group of sizes in a given range of lengths which can be obtained with the same cut-sew group by setting the speed to achieve the desired pack length.

Furthermore, at present, if products with a different size must be packed, i.e. a length of the pack not comprised in the range obtainable with the cut-sew group mounted on the machine, the cut-sew group must be replaced on the machine itself, which operation provides disassembling the entire cut-sew group and refitting one with a different configuration of heat-sealing spatulas.

Alternatively, again in the prior art, the change of size (i.e. of length range) of the pack can be obtained by either increasing or decreasing the number of spatulas mounted on the cut-sew group present in the machine. However, this solution requires an adjustment and the intervention of a specialized mechanic. Furthermore, to implement such a solution, it is necessary to wait for the spatulas to cool down before disassembling them, and then it is necessary to wait for the still-mounted spatulas to warm up again before using them. Therefore this operation requires rather long machine stops.

As a function of the different types of products to be packaged, the cut-sew group, i.e., the one which performs the transversal welds and the cut which separates the packs and which is located downstream of the longitudinal welding group, has a different configuration, i.e. a different arrangement of the heat-sealing spatulas on the shaft. As mentioned above, this operation can be carried out by physically changing the cut-sew group or by materially changing the number and position of the heat-sealing spatulas on the same cut-sew group to modify the range of pack lengths which can be made.

In the current state, the tool replacement operation implies deadtime in which the machine is idle and non-operational. Furthermore, the size change operation (i.e., we repeat, the range of lengths which can be produced) requires the intervention of specialized manpower because it implies the replacement of a heavy element, e.g. weighing about 200-300 kg, or alternatively the variation (decrease or increase) of the number of spatulas on the same group, and in both cases also requires the making of different connections and calibrations before being able to use the machine again.

These disadvantages (downtime and the need for specialized interventions) make it necessary to find a solution which allows the horizontal packaging machines to be more flexible and easy to modify.

Therefore, in the prior art, the need is felt for a single machine which can be easily adapted to the different sizes required for packaging products.

Furthermore, there is a widespread need to be able to automatically adapt the packaging machine to the use of different packaging films, which are available and required in different thicknesses according to the customer, and to be able to appropriately adjust the mutual position of the tools as a function of their thermal expansion.

SUMMARY OF THE INVENTION

Horizontal packaging machines have a feeding system for the products to be packaged. Typically, such a feeding group comprises a conveyor belt on which the products to be packaged are fed in an orderly manner and with appropriate spacing, as well as an advancement group according to a tortuous path of the packaging film.

In particular, the solution suggested here relates to a particular portion of the horizontal packaging machine, i.e. the cut-sew group (the group which performs the transversal welds of the edges of the packs).

One of the purposes of the present invention sets out to achieve the possibility of making packs of different sizes, or rather, of making packs belonging to different ranges of length, using a single horizontal packaging machine and exploiting an "immediate" and "automatic" tool change which can be done substantially by anyone at the plant, without requiring the intervention of specialized personnel.

The solution suggested for the invention here envisages a tool change which does not require a long machine stop for the physical replacement of a cut-sew group or a change in the number of spatulas on the group itself but allows the machine to be adapted to the different length sizes of the pack to be obtained without any need to disassemble and physically replace the cut-sew group or some spatulas.

However, in the specific case, the main purpose that the invention intends to achieve consists in automatically and micrometrically adapting the mutual position of the parallel and facing shafts which support the processing tools to the different types (in particular by thickness) of packaging films to be processed and to the inevitable thermal expansion of the processing tools.

The latter purpose, in particular, is achieved by a horizontal packaging machine for packaging a product fed in a horizontal direction according to appended claim 1 which states that such a packaging machine comprises a cut-sew group for making on a packaging film transverse welds and a cut to close and separate each other two successive packs, wherein the cut-sew group comprises a plurality of cut and sew tools for making the transverse welds and the cut, wherein the transverse welds define the edges of the packs according to different packaging sizes for the product, wherein the cut-sew group comprises an upper shaft and a lower shaft driven in rotation independently by means of a respective upper motor and a respective lower motor, in which each shaft mounts on it the plurality of cut and sew tools and in which each cut and sew tool is composed of an upper tool and a corresponding lower tool, and wherein compensation means are present of the mutual distance between the two with micrometric adjustment of the distance to compensate for thermal expansion and use of packaging film of different thickness.

Additional detailed technical features of the horizontal packaging machine for packaging a product fed in a horizontal direction of the present invention are provided in the related dependent claims.

It is a purpose of the invention also only the cut-sew group itself as disclosed in appended claim 10, the shafts of which are mutually parallel and have a height distance which is adjustable to allow the cut-sew group of the invention to be used also with packaging films of mutually different thicknesses.

The height adjustment of the mutual position of the shafts of the cut-sew group of the invention advantageously serves to adjust the welding and cutting pressure also as a function of the temperature of the spatulas.

Again, other detailed technical features of the cut-sew group are contained in the corresponding dependent claims.

BRIEF DESCRIPTION OF THE FIGURES

Further features and advantages of the invention will be apparent from the reading of the following description provided by way of non-limiting example, with the aid of the figures shown on the accompanying tables, wherein.

Figure 1:
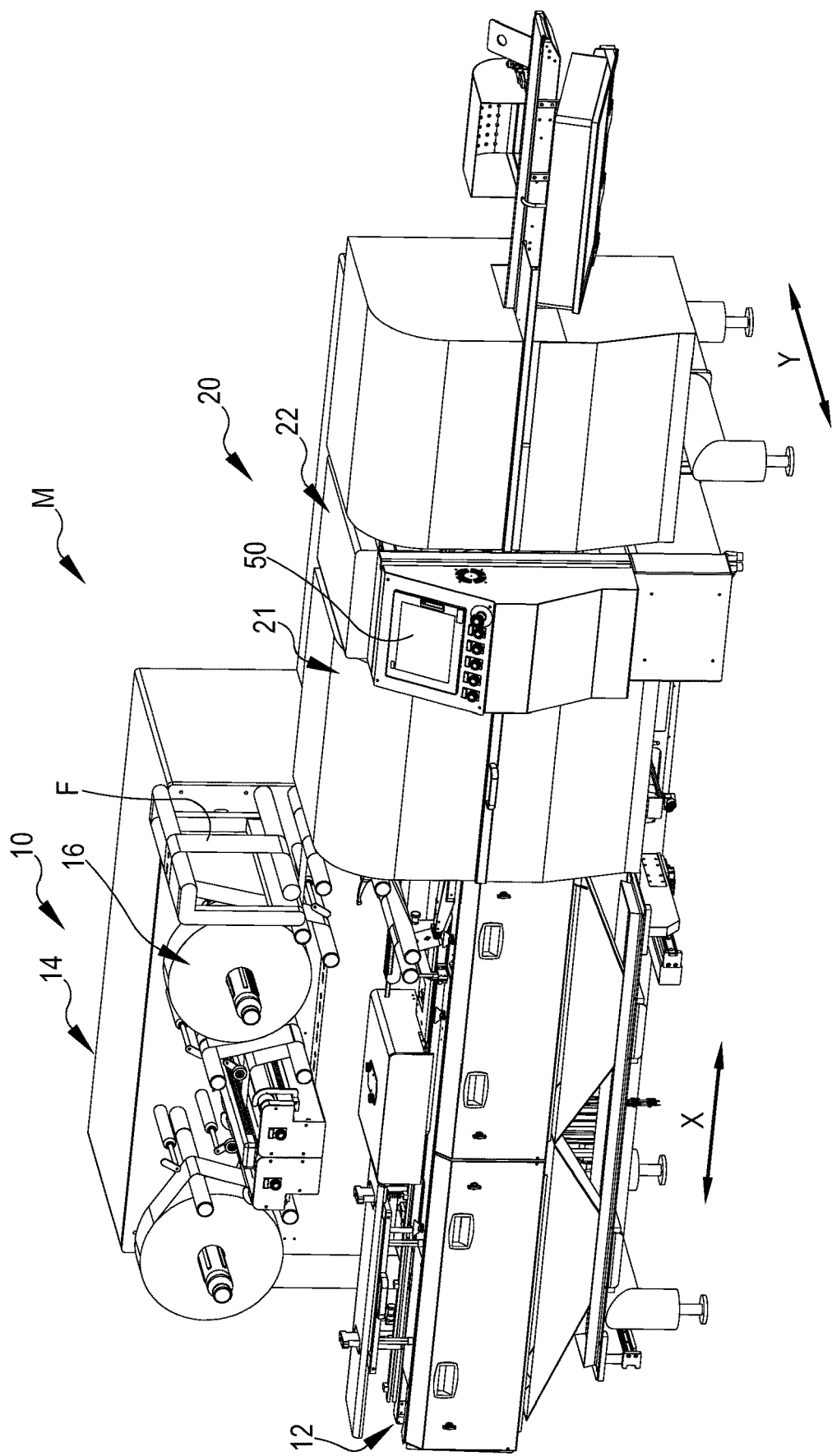
FIG. 1 shows a perspective diagrammatic view of a horizontal packaging machine according to the present invention.

The parts according to the present description are shown in the drawings, where appropriate, with conventional symbols, showing only those specific details which are pertinent to understanding the embodiments of the present invention, so as not to highlight details which will be immediately apparent to those skilled in the art with reference to the description given herein.

DETAILED DESCRIPTION OF THE INVENTION

The machine according to the present invention mounts a particular cut-sew group comprising a plurality of "cut and sew" tools designed for different lengths of packs or packets. Furthermore, the mutual distance (or position) in height between the shafts of the cut-sew group is adjustable in order to compensate for thermal expansion of the spatulas and to be able to use packaging films of different thicknesses.

In particular, the cut-sew group comprises two overlapping and facing rotating shafts which each carry the same plurality of cut and sew tools.

A cut and sew tool consists of one or more electrified heat-sealing spatulas arranged radially on the corresponding rotating shaft.

Transverse welding takes place by localized heating of the packaging film using a pair of electrified heat-sealing spatulas (an upper spatula and a lower spatula mounted on their respective tools) which periodically meet during shaft rotation and heat and weld the edges of the pack.

Finally, the cut-sew group further comprises cutting elements which are operated to separate two successive packs at the end of the first welding of the tail (or rear edge) of the finished pack and before the beginning of the second welding of the head (or front edge) of the pack being formed.

This cut is carried out by means of the aforementioned cutting elements, e.g. consisting of a blade and a counter-blade arranged inside the electrified heat-sealing spatula. In particular, in various embodiments, the blade will be mounted between two facing and spaced welding elements of the spatula on the upper shaft, and the counterblade will be mounted between two facing and spaced welding elements of the spatula on the lower shaft.

With the machine according to the invention, each cut and sew tool can be used to make a plurality of packaging sizes, and in this case, the operating speeds, i.e., the rotation speed of the two shafts, should also be varied in addition to the configuration and setup of the machine. Furthermore, the plurality of cut and sew tools in a single cut-sew group gives the machine a high degree of flexibility and adaptability.

In this manner, the machine becomes flexible and can be used to package different products or different sizes of the same product without interventions requiring the assembly or disassembly of the entire cut-sew group or the assembly or disassembly of the spatulas on or from the same cut-sew group.

The need to have a very flexible machine arises from the fact that some manufacturers need to make different packs for a single product to be put on the market, i.e. single, double or multiple packs, and they want to do this with a single machine. Therefore, the machine must have a configurable cut-sew group on board which can adapt to different sizes so that a large number of length ranges can be achieved.

Currently, as mentioned, the size (i.e. the length range) is changed by materially changing the entire cut-sew group (thus mounting a different cut-sew group on the machine, on a case-by-case basis, as needed) or by materially varying the desired number of spatulas present on the same group, requiring a machine stop which stops the production and needs the intervention of specialized personnel.

In contrast, the cut-sew group according to the present invention comprises various conformations which provide a plurality of cut and sew tools carried by two overlapping, facing rotating shafts. Each cut and sew tool comprises one or more electrified heat-sealing spatulas arranged radially on each rotating shaft of the cut-sew group.

The different cut and sew tools, composed of one or more spatulas, are mounted on a single cut-sew group and this allows to achieve the various sizes (for instance range of lengths) by selecting each time the cut and sew tool to be used inside the same cut-sew group mounted on the machine. Of course, the cut-sew group can comprise any number of tools (at least two) to achieve a variety of different sizes.

In the examples illustrated in the Figures, which show the preferred embodiment, the cut-sew group comprises three different cut and sew tools arranged spaced apart on respective shafts of the cut-sew group. In particular, on the upper shaft there are three upper tools and on the lower shaft there are the three lower tools aligned to cooperate with their corresponding upper tools.

In the machine of the invention suggested herein, the tool is changed by modifying the position of the cut-sew group, i.e. by making the entire cut-sew group translate transversely relative to the feeding direction of the product to be packaged and centering the desired cut and sew tool, e.g. the central tool, relative to the feeding position of the packaging film and the product to be packaged.

Therefore, the cut-sew group is a mechanical element which moves, by virtue of a carriage or a slide, with a motorized command to arrange the desired upper and lower tools at the packaging film and the belt which feeds the products to be packaged.

In the embodiments considered and illustrated in the drawings, the cut-sew group comprises, as mentioned, three cut and sew tools (three upper and three lower), and this configuration allows maintaining approximately the same overall dimensions of the machine without impacting too heavily on the space occupied by the machine in a plant.

At the current state of the art, there are no horizontal packaging machines of this type on the market.

The entire horizontal packaging machine of the current invention will now be described in a preferred but not limiting embodiment of the invention.

The horizontal packaging machine comprises a conveyor belt which transports the products P to be packaged spaced out from each other according to a predetermined pitch and feeds them to the packaging machine in a forming group where it meets a reel of packaging film coming from a film unwinding group. The product passes through the forming tunnel in which the film spread and unwound from the reel is folded to form a tube which envelopes the product and is longitudinally welded by a group of pairs of heat-sealing wheels.

Downstream of the forming group there is the cut-sew group, in which the pack is welded and cut at its two ends in the transverse direction relative to the longitudinal weld made earlier. The cut-sew group welds the bottom (or tail or rear edge) of the first pack, then cuts and finally welds the head (or front edge) of the next pack.

The transverse welding tool (upper and lower) comprises one or more transverse welding spatulas, which are electrified and heat-activated spatulas.

Cutting elements, such as blades to cut and divide one pack from the next are present within each spatula, between the two facing welding elements.

Each upper and lower cut and sew tool is made, as a function of the set of pack lengths to be obtained, by one or more spatulas positioned to cut the packs to the correct and desired size.

For example, with the packaging machine of the invention shown in the following drawings, the product feed rate is 1,250 products per minute to obtain a single pack, i.e., wrap a single product P.

The cut and sew tool for single packs is made of a plurality of spatulas spaced with a pitch to support these high numbers otherwise the tool with a single spatula would have to turn at an excessively high speed and reach excessively high accelerations.

At the moment, the cut-sew group in the current machines on the market creates a single size consisting of a set of lengths, and in order to change the size it's necessary, as mentioned above, to change the entire group formed by two shafts or it is necessary to vary the number of spatulas by adding or removing spatulas.

These operations disadvantageously involve costs, machine stops, and the presence of a specialized mechanic who makes the change by disassembling the entire cut-sew group or by varying the number of spatulas according to needs.

Furthermore, at present, the size change cannot be carried out by a simple food industry operator, e.g. the operator who changes the reel of the packaging film or who checks the packs, because the right professional is required for this type of intervention.

Indeed, the specialized mechanic must disassemble the heavy cut-sew group, e.g. weighting up to one quintal, disconnect the various connections of the group with the machine, mount a new group, and reconnect the various cables and connections. Alternatively, the specialized mechanic must act directly on the cut-sew group by assembling or disassembling spatulas.

With the solution described here, the cut-sew group comprising a plurality of upper and lower tools is simply made to slide transversely relative to the advancement direction of the product by virtue of a carriage or slide to change the tool used to obtain a different size of the final pack.

In the embodiments illustrated in the figures, when the two shafts of the cut-sew group rotate and one of the three tools is working the other two tools also rotate integrally with the shafts but the spatulas of the other two tools are arranged offset relative to the spatulas of the tool in use so that when a spatula of the upper tool in use touches a spatula of the lower tool in use, the upper and lower spatulas of the other two tools are in such a position as not to touch each other, i.e., they are offset so as not to be in contact.

In the assembly of the different tools, there are offsets among the spatulas that make up the tools, i.e., if in the first tool the spatulas are positioned in the origin the first spatula of the second tool will have an offset relative to the origin and the first spatula of the third tool will have a further offset relative to the spatulas of the other two tools.

The two shafts that make up the cut-sew group have independent motors to achieve the initial alignment of the upper and lower tools. In particular, the alignment is done with a Homing technique, i.e., fine-tuning the positions of the tools on the two shafts. When the operator communicates to the machine through the operator panel the intention to work with one of the tools, the upper and lower tools must be aligned. This is done with the two independent servo-assisted motors which are mechanically synchronized.

Therefore, the solution according to the invention allows achieving an easy tool change to obtain a change which allows for a large number of length ranges of the pack. The cut-sew group is assembled once and then an adjustment is made with the two separate motors to align the tools to be used with each other and positioning of the cut-sew group to the feed line of the products to be packaged.

The packaging machine includes several motors for the various adjustments. In particular, there are two separate motors, one for each shaft on which the welding tools are mounted so that the shafts can turn independently during initial calibration. Normally, in regular operation, the two motors run synchronously.

The horizontal packaging machine of the invention further comprises a motor for positioning the cut-sew group and, finally, a motor for vertically moving the upper shaft.

Therefore, the spatulas of the selected welding tools are heated to perform the welding.

The welding tools are connected through connecting cables to an electrical collector group. Particularly, there are two separate collectors, one for each shaft, and each tool in the cut-sew group is independently connected to its respective collector.

This allows each tool to be controlled separately so that only the tool in use is heated, leaving other tools unheated. In this manner, the collectors supply electricity to the spatulas through cables running through the shafts. The spatulas are heated by means of heating elements powered by electricity.

Furthermore, this separate connection allows to set a different temperature for each tool group. Furthermore, this separate connection allows to have a different temperature for the same group of tools in case a different packaging film with different thermal features or with a different thickness is used.

An electrical collector is a system which carries an electrical signal on a rotating shaft. The electrical collector inside presents rotating brushes and fixed brushes which generate a rotating sliding contact for transmitting the electrical signal.

The rotating collector is an electromechanical device which allows the transmission of power and electrical signals continuously from a static part to a rotating part or vice versa by maintaining constant temperatures on the spatulas by transmitting a signal from a thermocouple.

This solution, capable of continuous rotation, can significantly simplify the steps of mounting and assembly, avoiding the use of articulated systems with complex wiring with the possibility of damage and machine stop, drastically reducing maintenance interventions.

According to the transmission technology, the rotating collectors can manage power, data, or both in one combined solution.

The collector used in the solution suggested here can differentiate the temperatures of the various welding tools, allowing different temperatures to be selected for each tool of the plurality. Of course, while a tool is being used, i.e. the spatulas of the tool are heated, other unused tools remain cold. This also serves to minimize electrical energy consumption.

The collector used is devised so that it is all differentiable, so that only the spatulas of the tool in use are independently heated.

The support structure of the packaging machine requires the shafts carrying the cut-sew group to be supported by a frame and there are bearings to facilitate the rotation of the shafts.

We now turn to a detailed description of an embodiment with the aid of the figures.

With reference to FIG. 1, a horizontal packaging machine is indicated by reference M as a whole.

The horizontal packaging machine M comprises a feeding portion 10 and a welding portion 20, which in turn comprises a cut-sew group 22. The feeding portion 10 comprises a conveyor belt 12 for conveying the product to be packaged P in an orderly and cadenced manner, and a film unwinding group 14. In the film unwinding group 14, a reel 16 of packaging film F is unwound to go into the tunnel to pack the product P fed on the conveyor belt 12. Preferably, the conveyor belt 12 provides seats 12a obtained on the conveyor belt by virtue of transversal walls 12b created on the belt 12 and which allow the right spacing between the different products P. The packaging film F is wound on the reel 16 and through a series of return rollers 17 is unwound and kept in tension to feed the second portion of the machine, i.e., the welding portion 20.

The welding portion 20 makes the final pack and performs three welds, one longitudinal relative to the advancement direction of the product to be packaged P, and two transverse welds to separate the packs from each other. The transverse welds are the two welds that make the edges of each pack.

The solution of the invention described here focuses on transversal welding and employs a special cut-sew group 22 (also known as a "crimper"), which allows making packs of different sizes as will be better described below. The cut-sew group 22 can have different configurations according to the format and size of the product P to be packaged.

Figure 2:
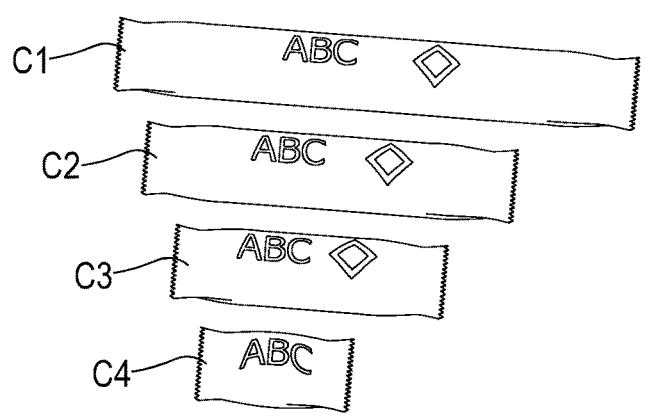
FIG. 2 shows different packaging sizes for the same product, all of which can be made using the horizontal packaging machine in FIG. 1.
Figure 3:
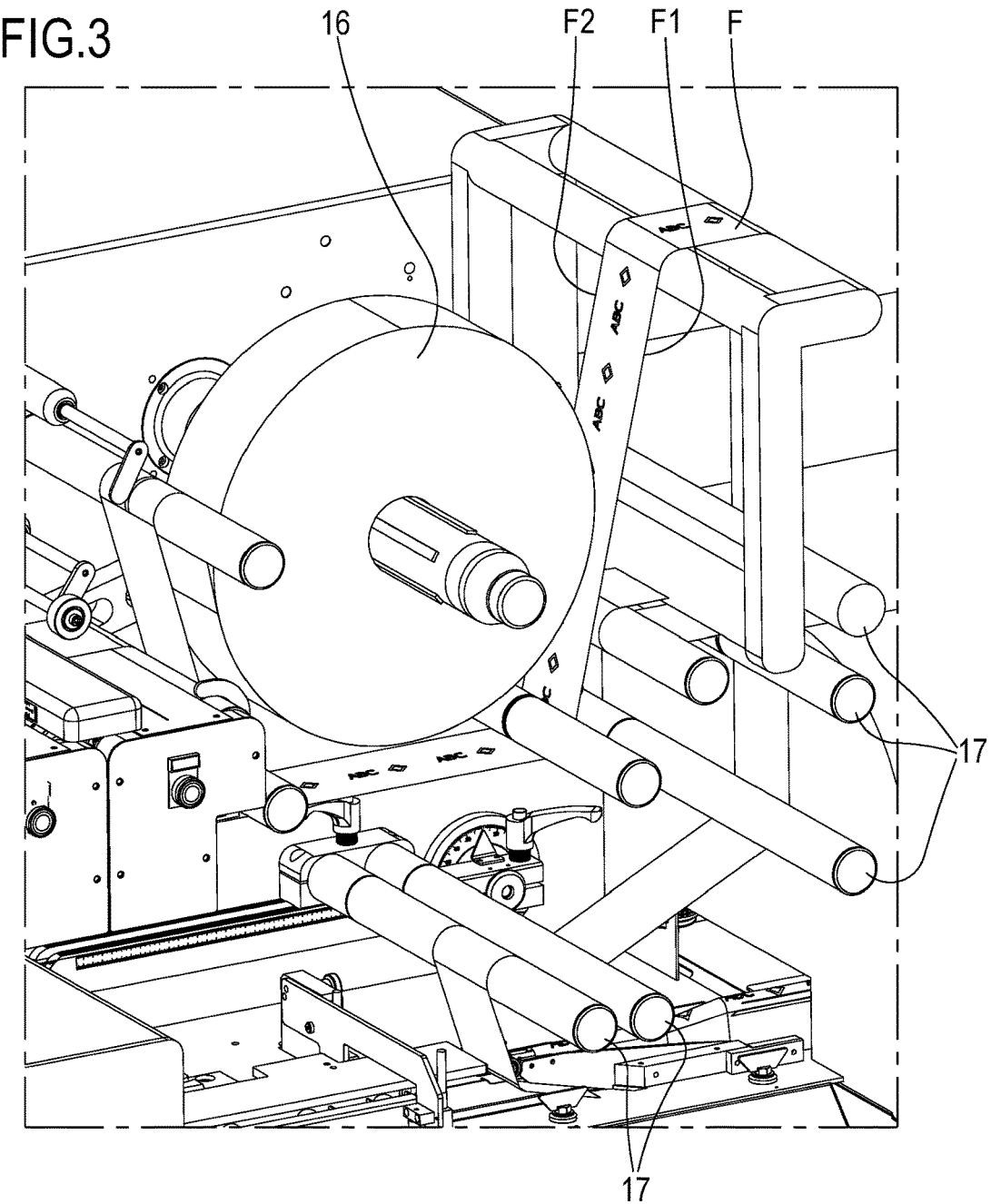
FIGS. 3 to 8 show some enlarged views of details of the product feed portion of the horizontal packaging machine in FIG. 1.
Figure 4:
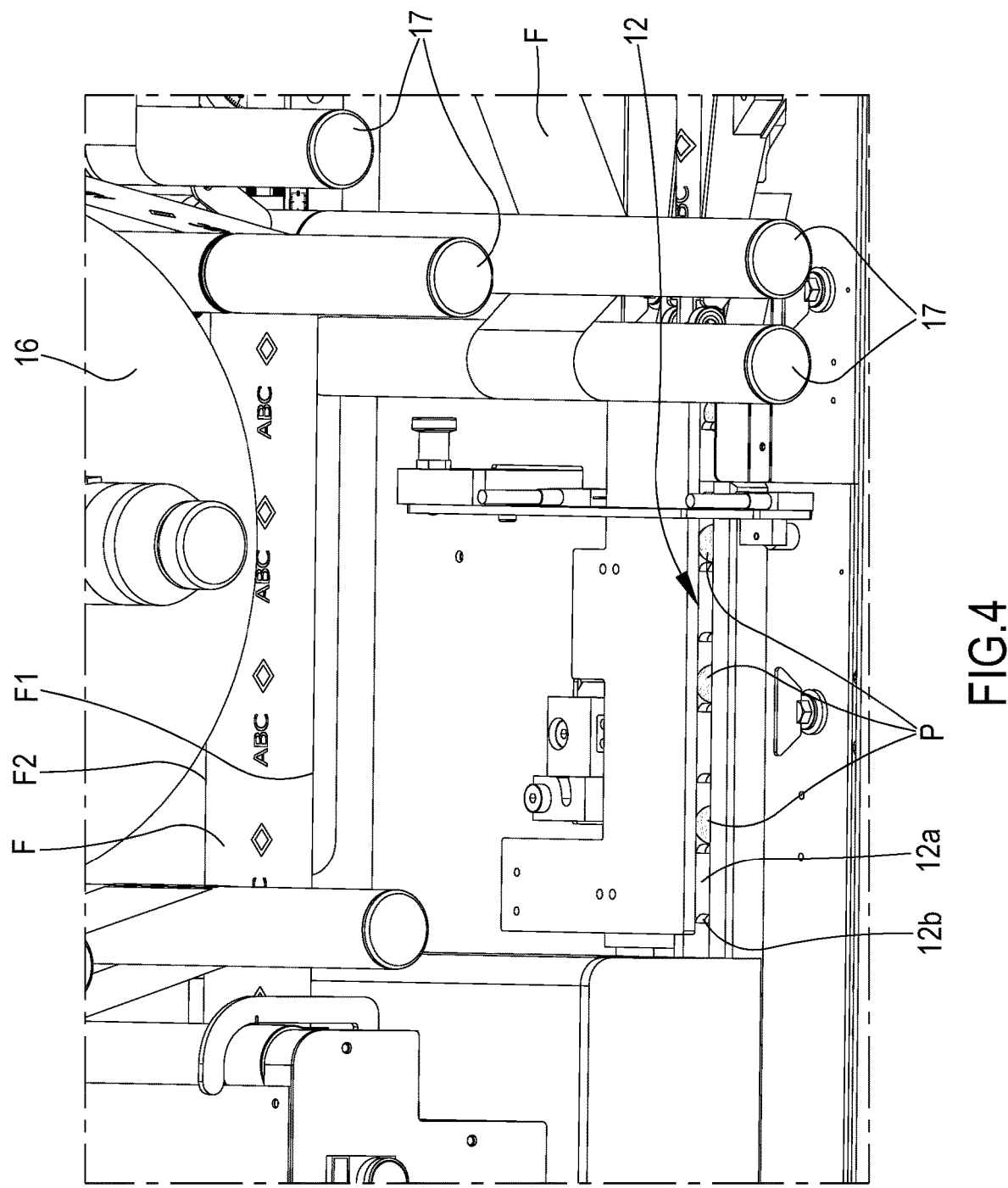
Figure 5:
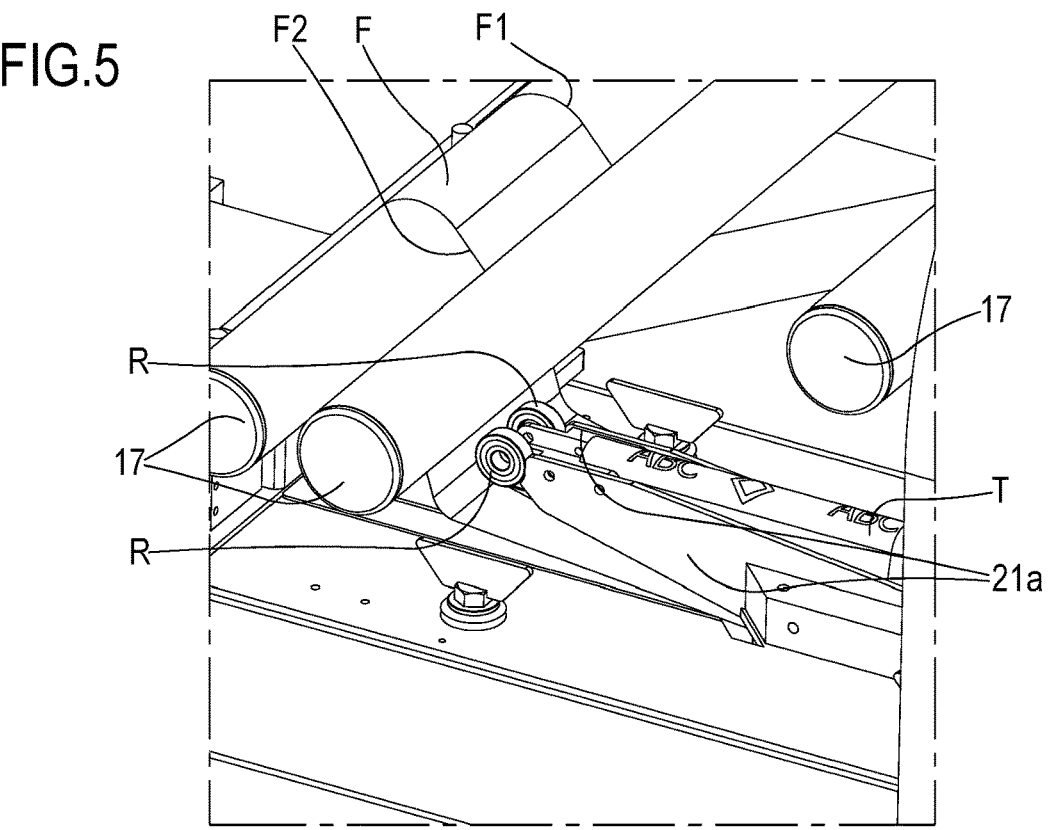
Figure 6:
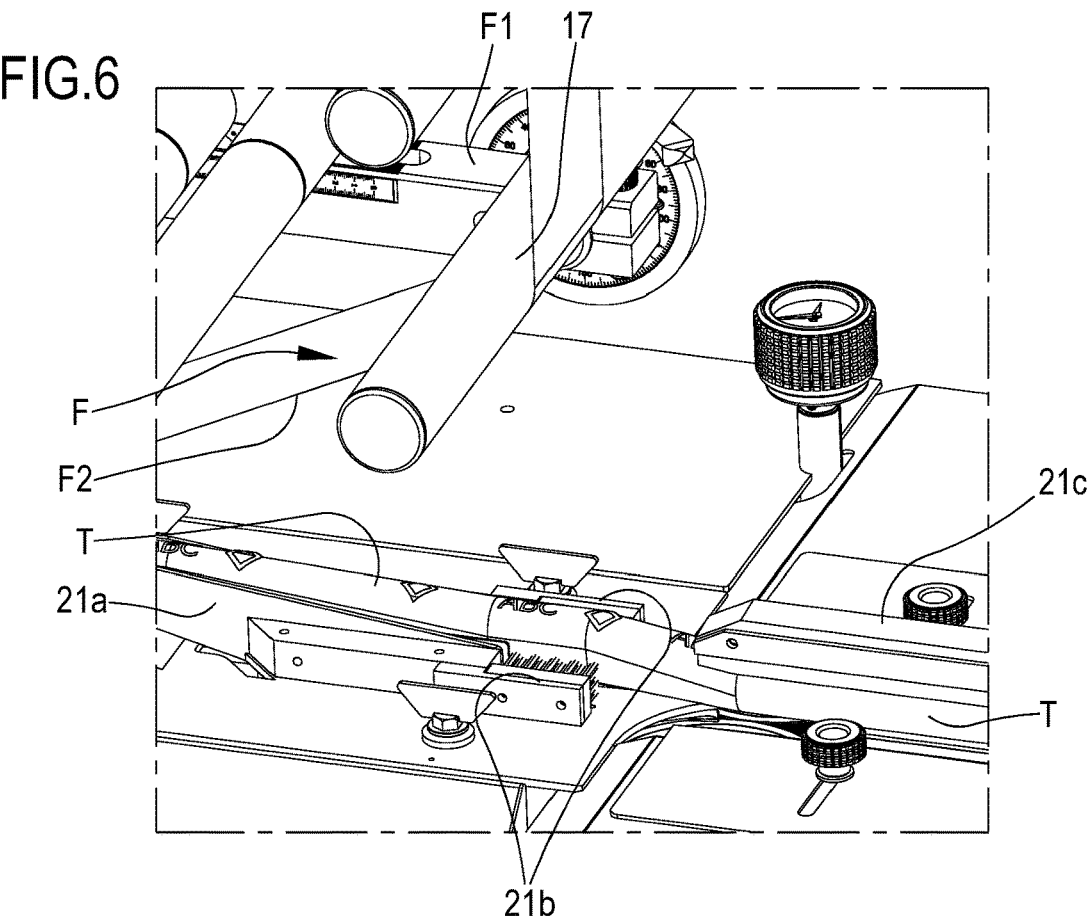
Figure 7:
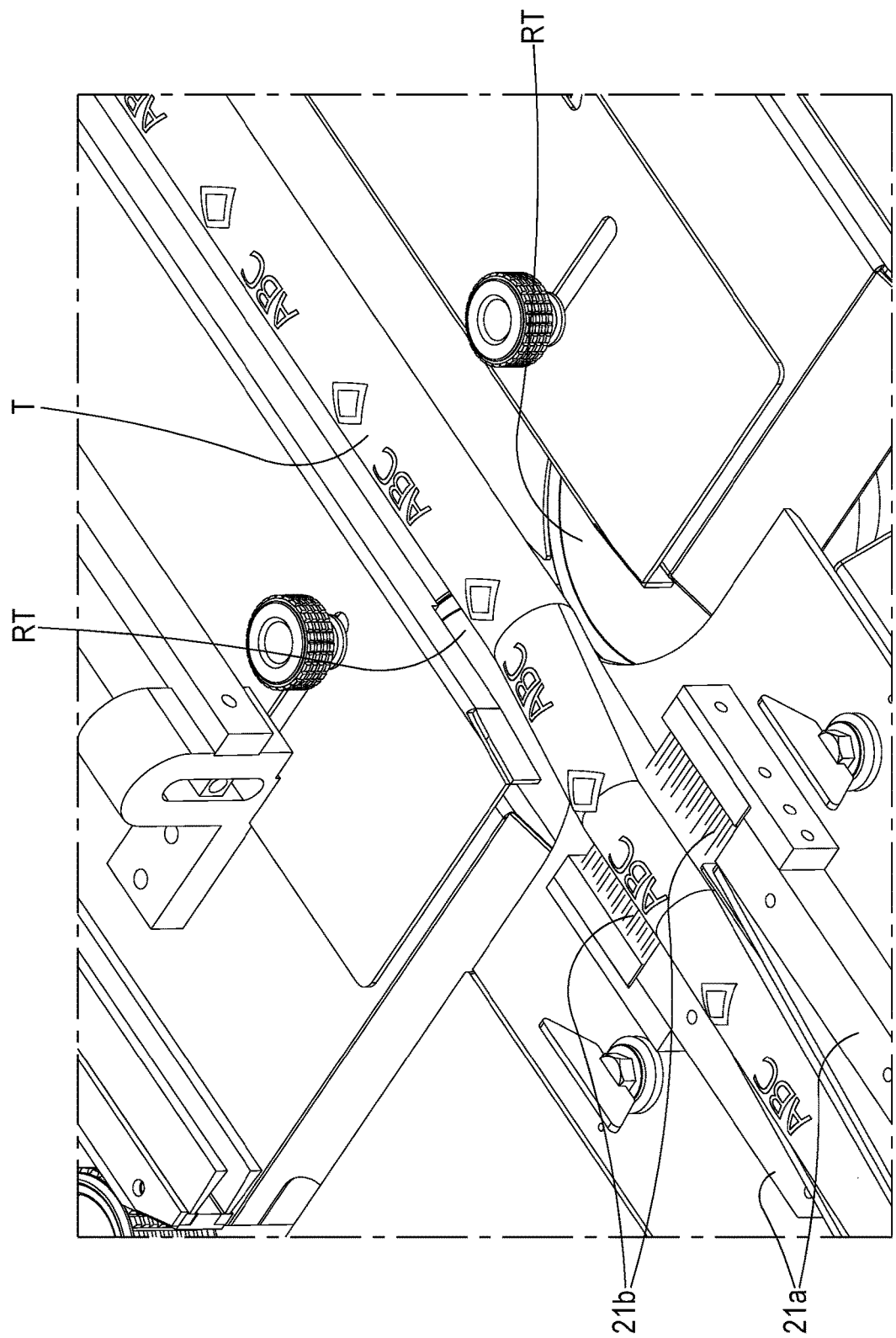
Figure 8:
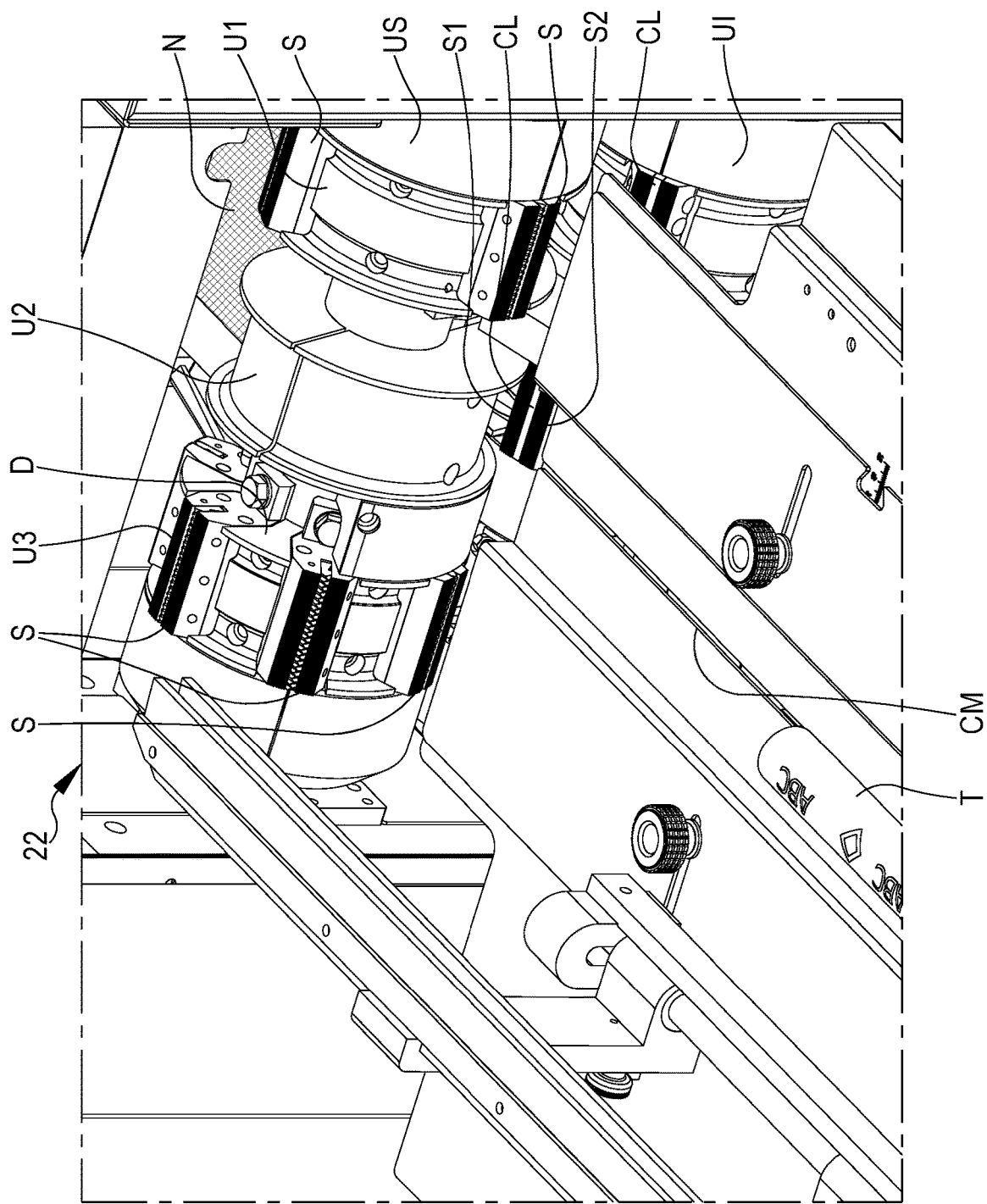

FIG. 2 shows some possible packs all of which can be made with the machine according to the present invention. In particular, there can be a multiple pack of five pieces indicated by reference C1, a triple pack indicated by reference C2, a double pack indicated by reference C3, and a single pack indicated by reference C4. Of course, it is also possible to provide other sizes with a different number of products inside and with different pack lengths.

The cut-sew group 22 is preceded by a tunnel forming group 21, in which the packaging film F is arranged to create a tube T to receive the product P to be packaged within it. Then, the lower portion of the tube T is closed by welding the two free ends F1 and F2 of the packaging film F, which are folded to envelope and surround product P or the products to be packaged.

In the figures, it is possible to see the forming group of the tunnel 21, in which the packaging film F arrives spread and folded by means of the forming bars 21a to form the tube T into which the product or products P to be packaged are subsequently inserted. The forming bars 21a each mount a guide wheel R. At the end of the forming bars 21a there are two side brushes 21b and an upper brush 21c for appropriately shaping the tube T made with the packaging film F.

Once tube T has been created, the lower longitudinal weld is made (relative to the advancement direction of the product or products P to be packaged). Typically, such a longitudinal welding is carried out through a series of pairs of heat-sealing wheels RT which heat and form together the lower closure by welding the two free side ends F1 and F2 of the packaging film F (some details are not visible in the drawings).

The tube thus formed, welded in its lower part and filled with the product to be packaged, is then fed to the cut-sew group 22, which allows obtaining the packs by making the transversal welds and the cut to separate two packs from each other. Therefore, every machine M is created with a cut-sew group 22 which mounts a set of tools. In the case illustrated in the figures, the set comprises three tools U1, U2 and U3 mounted spaced on their respective rotating shafts.

As a function of the various products to be packaged, the cut-sew group 22 presents a different conformation. The packs which can be obtained are of different types and can be long or short, wide or narrow according to the product P that they must contain. The cut-sew group 22 can be used to make the two lateral welds with the size of the required pack length. The packaging film F is welded into a tube wrapper about the product to be packaged, and the cut-sew group 22 is used to separate the mutually different packs. In particular, the rotating cut-sew group 22 defines how long the tube is to be cut and creates welds and cuts at a defined distance. Each cut defines the tail of the pack just finished and the head of the new pack being made. More in detail, the cut is made in the center of the weld, which is performed by a tool of the cut-sew group 22.

Figure 9:
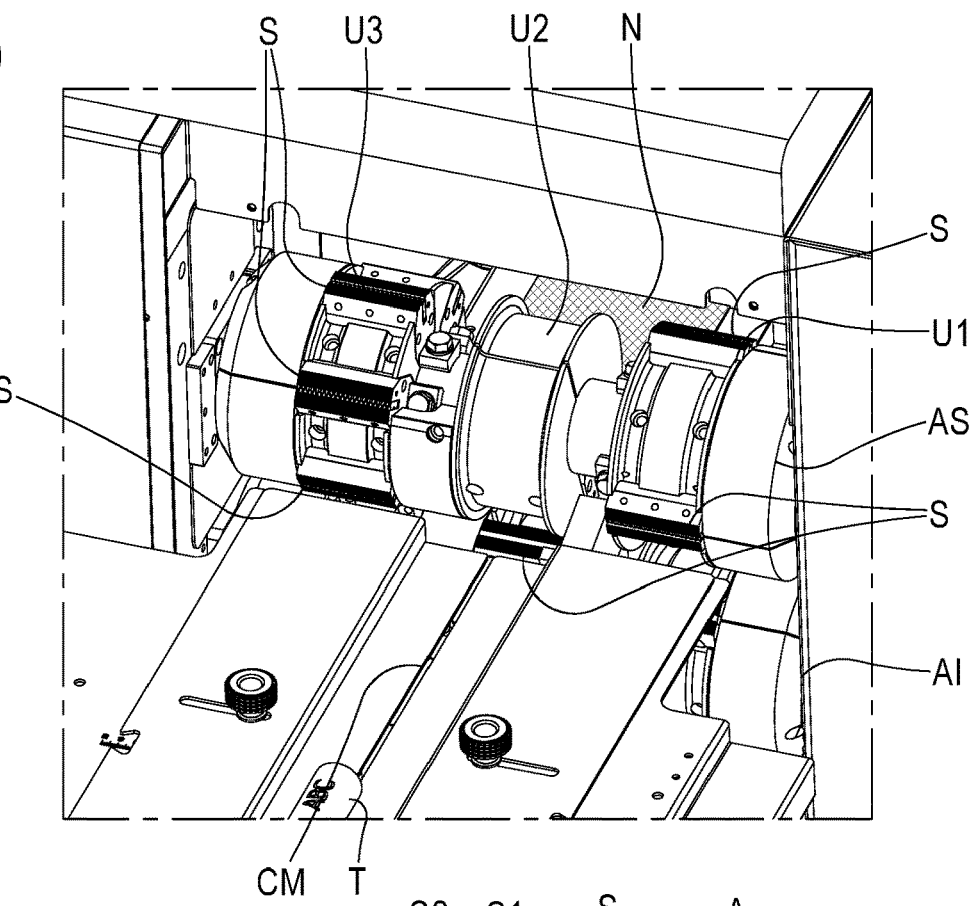
FIGS. 9-11 show construction details of the cut-sew group according to the present invention.

FIG. 9 shows one of the three tools U of the cut-sew group 22 which fits a plurality of spatulas S, in particular the upper tool US is shown. A corresponding lower tool UI is fitted at the lower shaft (not fully visible). This figure shows the tool U3 to make single packs which mount six spatulas for each of the upper tool US and lower tool UI.

FIG. 9 shows two spatulas S spaced 60 degrees apart. Each spatula S consists of a first welding element S1 and a second welding element S2. The two welding elements S1 and S2 are parallel welding bars, facing each other and spaced to form an opening between them within which the cutting element or blade L is positioned. Typically, the welding bars S1 and S2 have a knurling or grooving SZ on the welding surface which makes the classic crimped impressions on the welds of the packaging film F. The welding bars S1 and S2 of the spatulas S are heated by resistors powered by the current supplied by the collectors.

Figure 10:
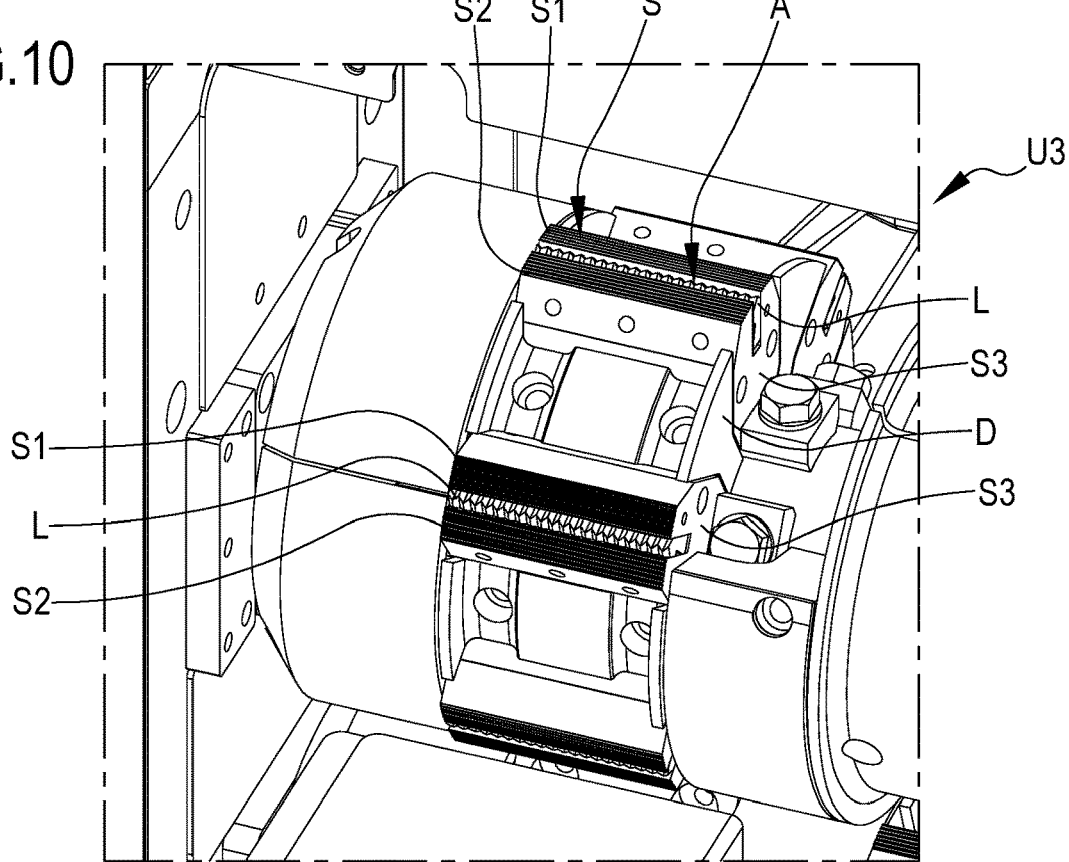

FIG. 9 shows a cutting element L in the form of a serrated blade (or zigzag blade) that allows to make the classic zigzag-shaped cuts for heat-welded flowpack packaging. At the corresponding lower tool UI, the cutting element is a straight counterblade CL, e.g. as shown in FIG. 10. The counterblade CL is fitted on cup springs to cushion the blow of the blade L during cutting. The cutting elements L and CL are actuated during or at the end of welding and are controlled by actuators. In particular, the blade L mounted on the upper shaft AS is driven, i.e. it is lowered to approach the counterblade CL fitted on the lower shaft AI and thus make the cut.

The cutting elements L (blade) and CL (counterblade) are preferably made of hard steel.

In particular, the zigzag-shaped cuts can be seen in FIG. 2 on the side edges of the illustrated packs. A straight cut can also be provided in which both the upper and lower cutting elements are straight and make a scissor-type cut.

In the embodiment shown in the figures, the three tools U1, U2, and U3 fit three spatulas S, a single spatula S, and six spatulas S, respectively. Therefore, tool U1 fit one spatula every 120 degrees, tool U2 fits a single spatula, and tool U3 fits six spatulas 60° degrees apart.

In this case, preferentially in a non-binding manner, medium packs (two to five products in the same pack) are preferably made with the U1 tool, long packs (seven to ten products in the same pack) are made with the U2 tool, and small packs (single or double) are made with the U3 tool.

On the machine M, there is a centering portion called the machine center CM, i.e. a colored band N indicating the central portion of the machine M. The selection of the tool to be used is made by aligning the tool U1, U2, or U3 with the machine center CM, that is, by translating transversely the cut-sew group 22 to align one of the three tools with the machine center CM. The machine center position CM is aligned with the feed portion 10 and more in detail with the conveyor belt 12 which feeds the product P.

Once the tool to be used, such as U2, is selected, the upper shaft AS and lower shaft AI are aligned with the Homing operation to match the upper and lower spatulas. Of course, this operation must be repeated whenever the tool is changed. Then a fitting tuning operation is performed between the position of the upper shaft AS and the position of the lower shaft AI. In particular, in the case of tool U3, the lower shaft AI is brought to the home position, then the upper shaft AS is brought to the 30-degree alignment position and stopped. Subsequently, the lower shaft AI is also moved to the 30-degree alignment position to align the spatulas S of the upper tool US and the lower tool UI.

In the case of the central tool U2, the homing operation brings both shafts to zero and there is a synchronous 360-degree rotation of the two shafts.

Figure 11:
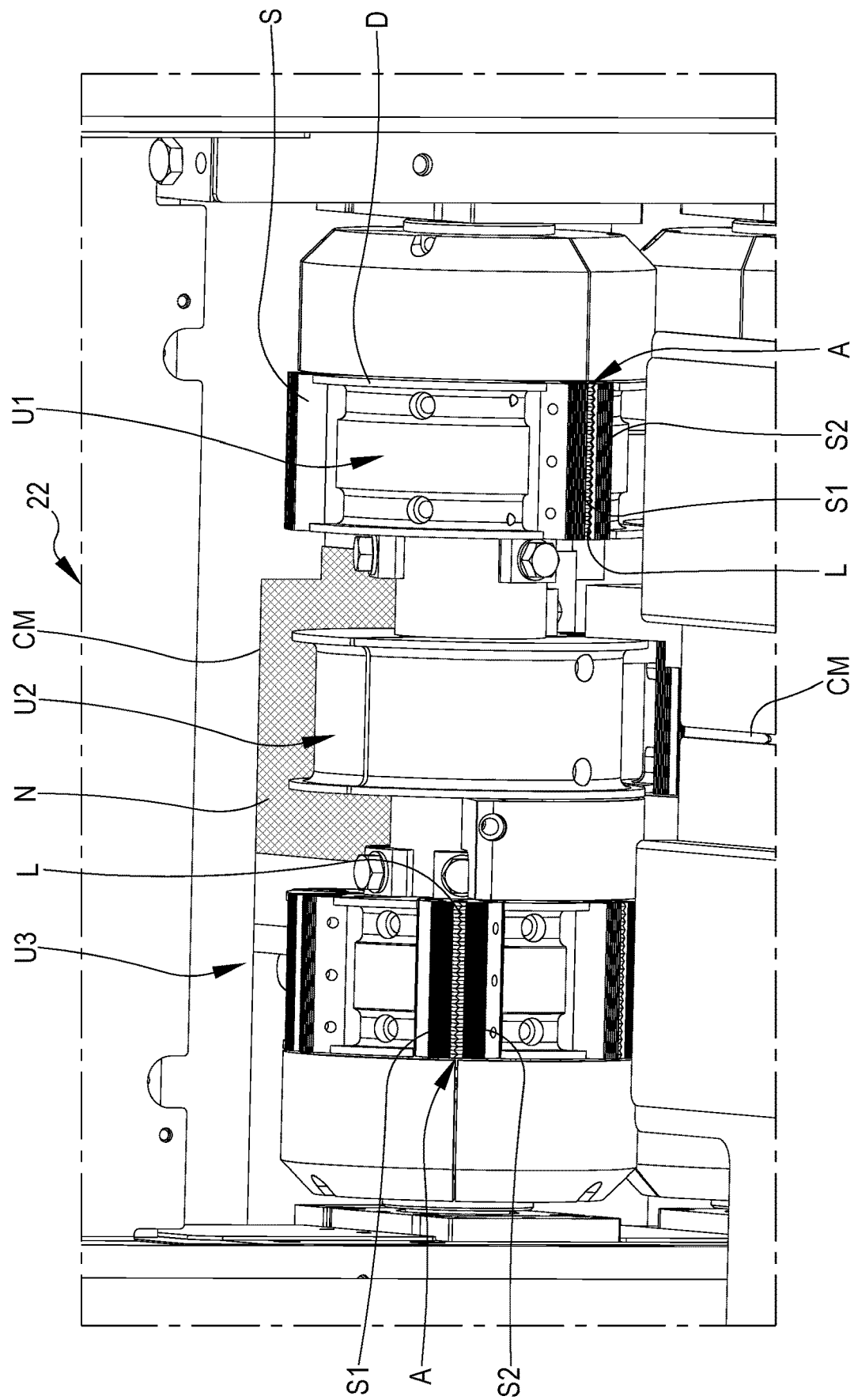
Figure 12:
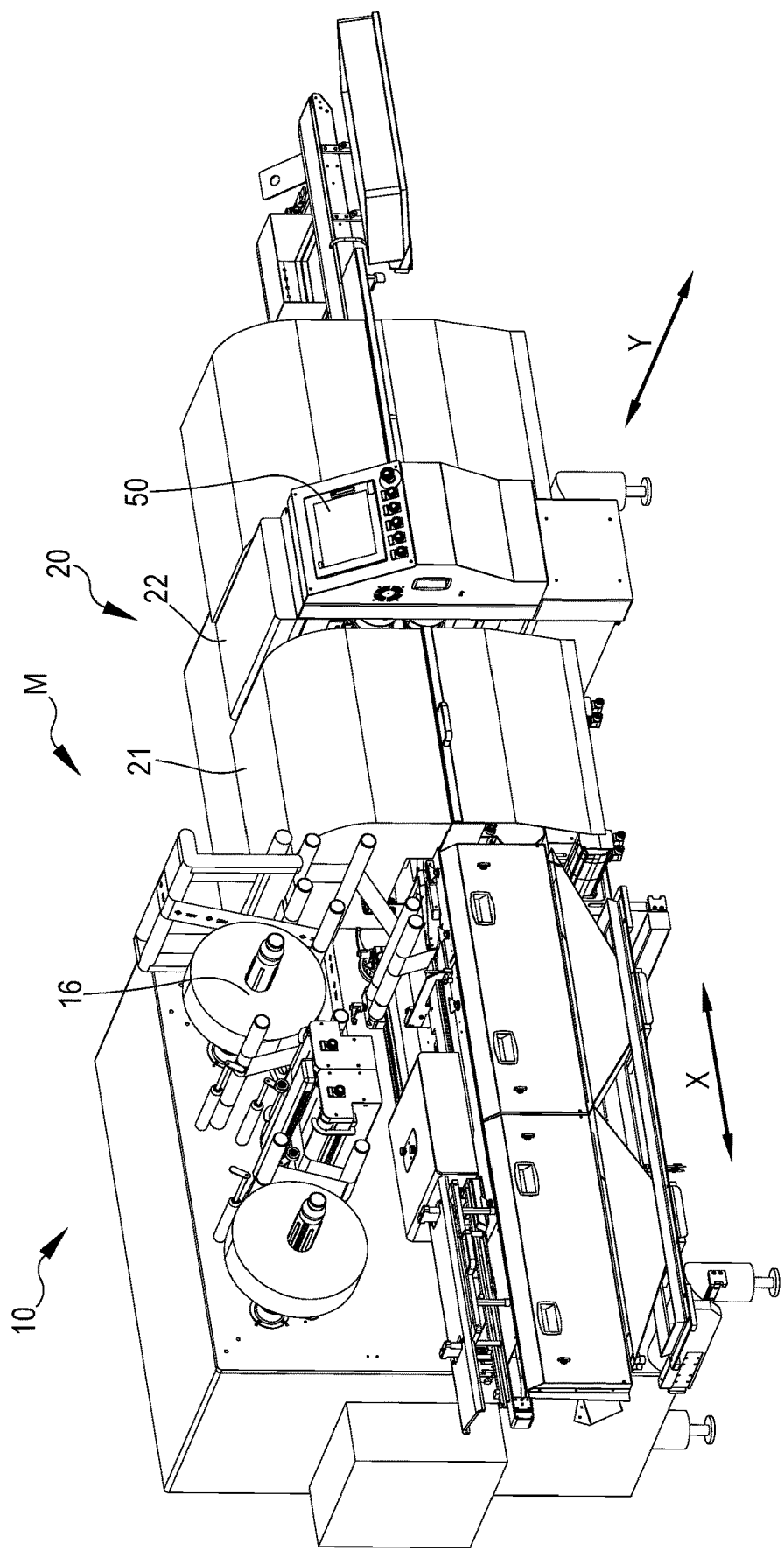
FIG. 12 shows a perspective diagrammatic view of a horizontal packaging machine according to the present invention.
Figure 13:
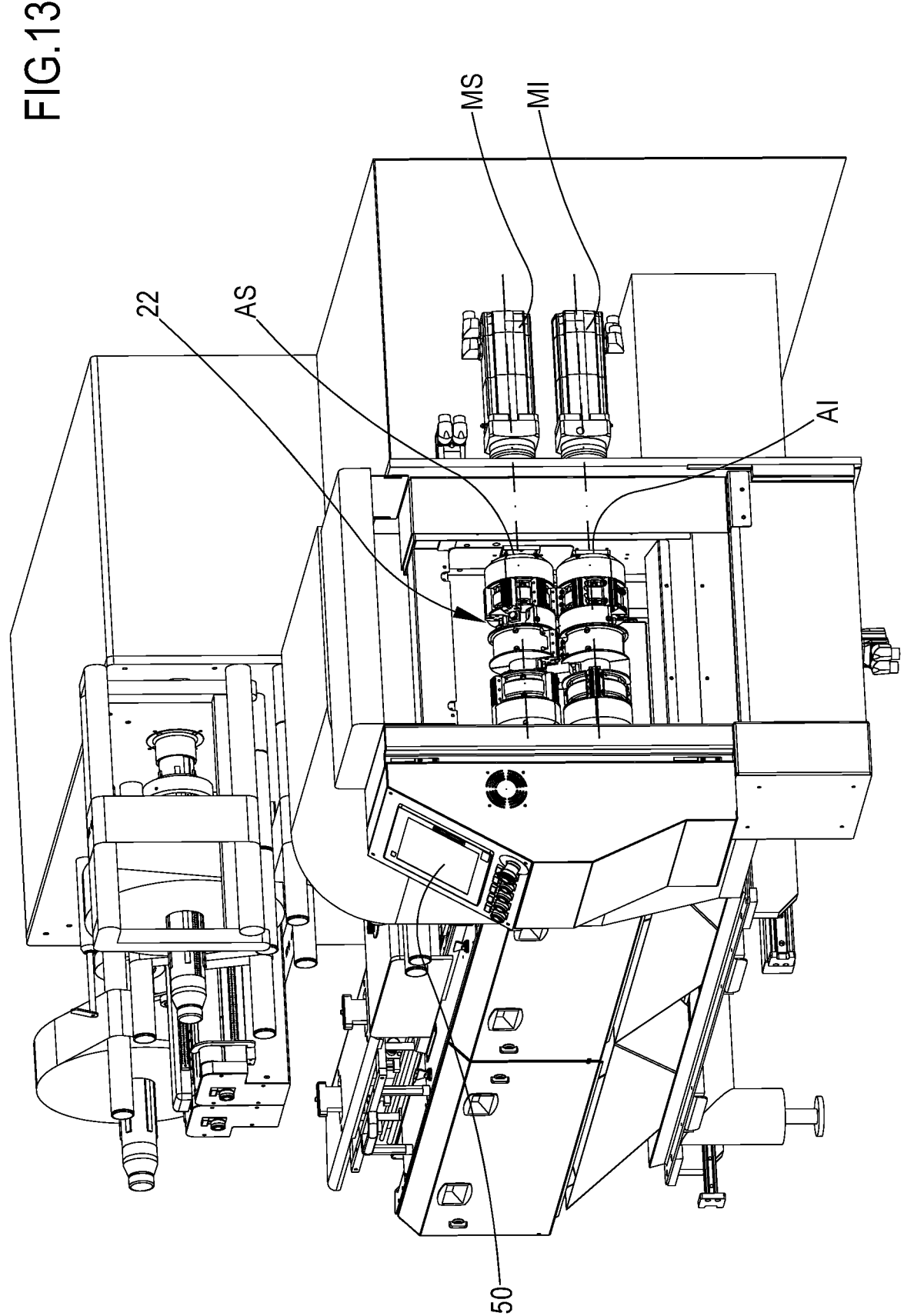
FIG. 13 shows a side and partially cross-section view of the horizontal packaging machine of FIG. 12, in which the cut-sew group according to the present invention is visible.

FIG. 11 illustrates a side section of the cut-sew group 22 showing the tools of the cut-sew group 22 and in particular the U3 tool for making single packs which mounts six spatulas S, as mentioned above. The spatulas S are mounted cantilevered from the upper shaft AS and the lower shaft AI. As best seen in FIG. 11, the two welding elements S1 and S2 are parallel, facing, and spaced solder bars connected by a central portion S3. The central portion S3 of each spatula S is connected to the shaft AS or AI e.g. by bolted flanges or brackets which are made integral with the shaft on which they are mounted. Spacer elements D can be fitted between the different spatulas S of each tool U.

Figure 14:
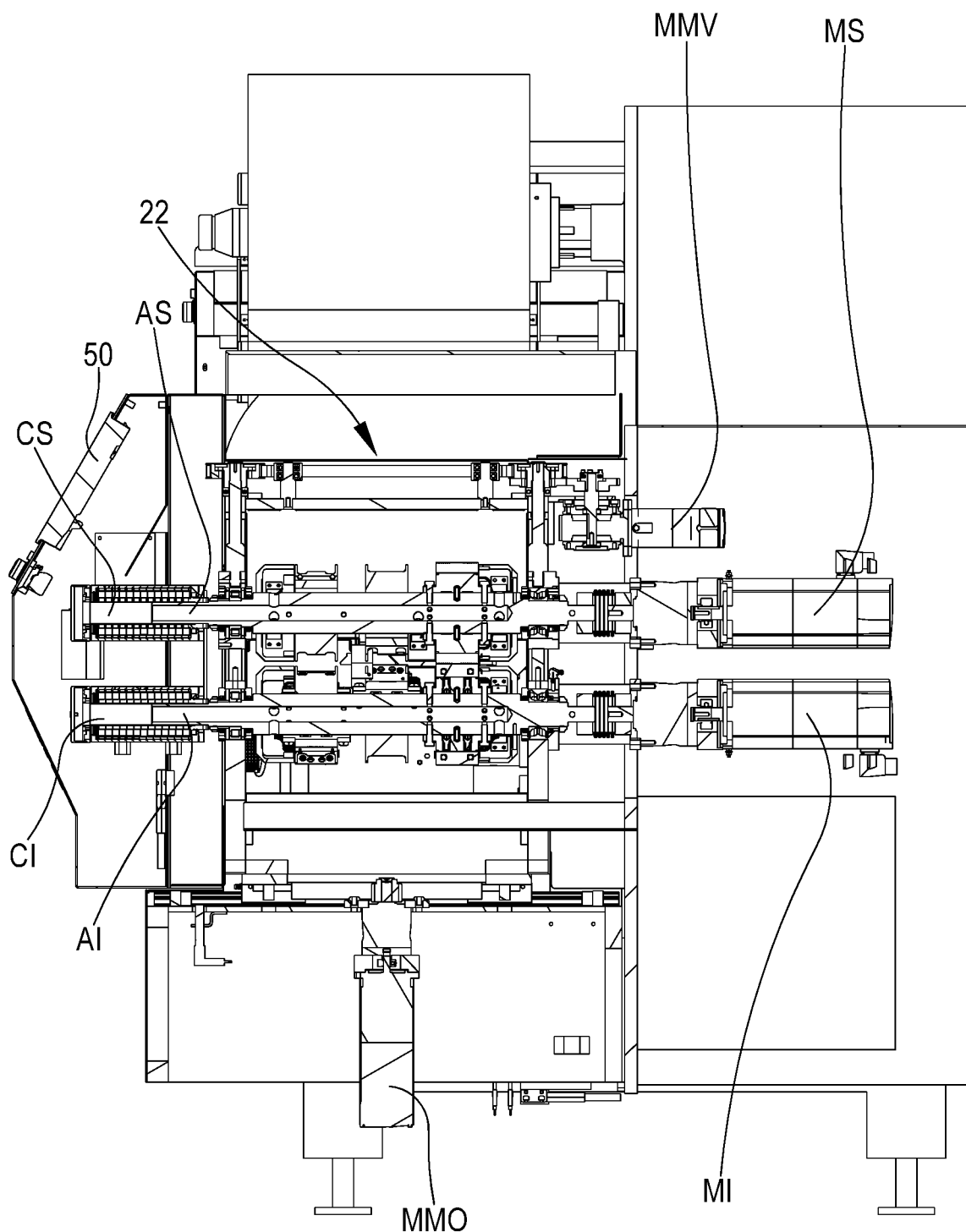
FIGS. 14 and 15 show cross-section views of the horizontal packaging machine of FIG. 12, in which the cut-sew group according to the present invention is visible.
Figure 15:
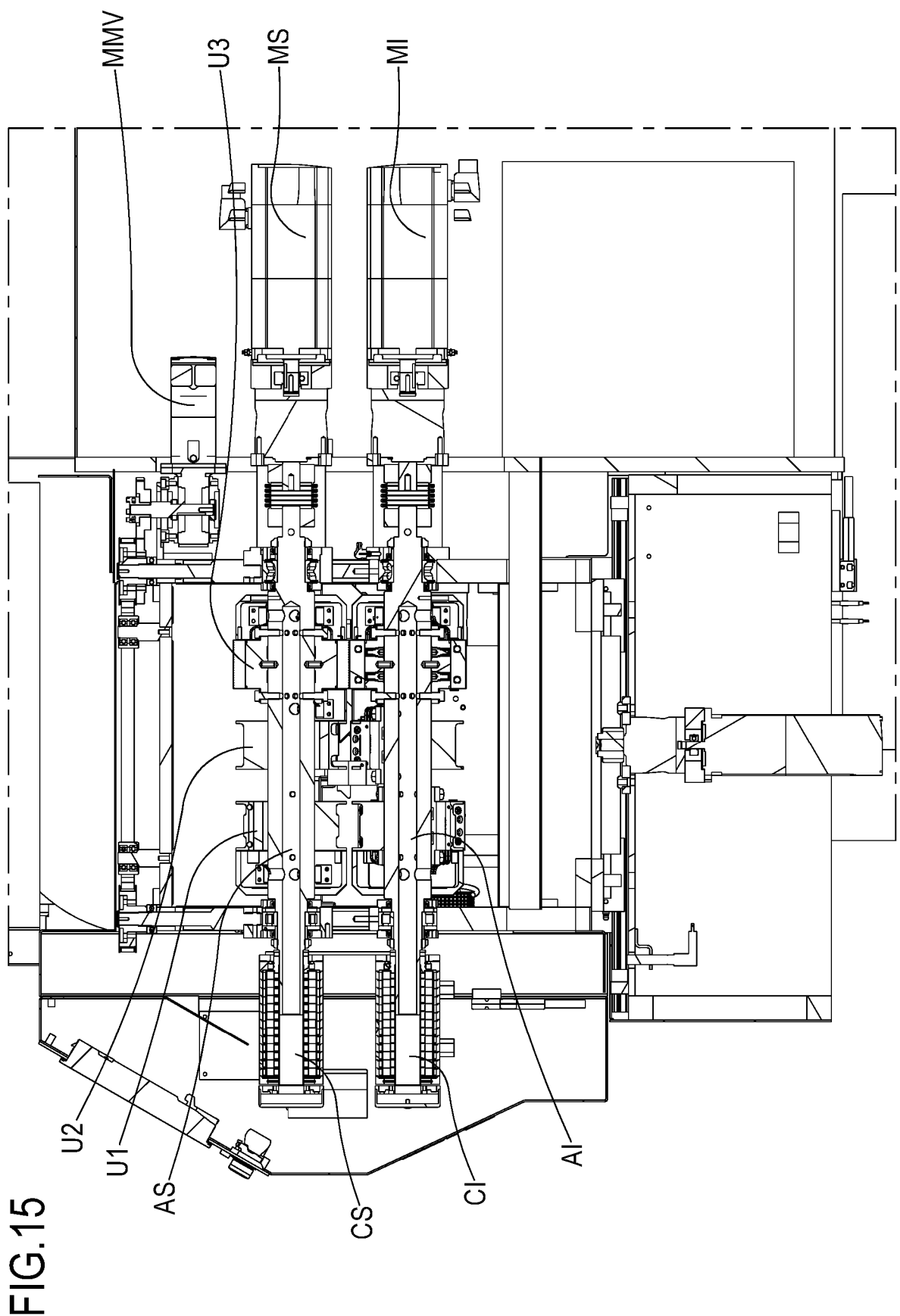
Figure 16:
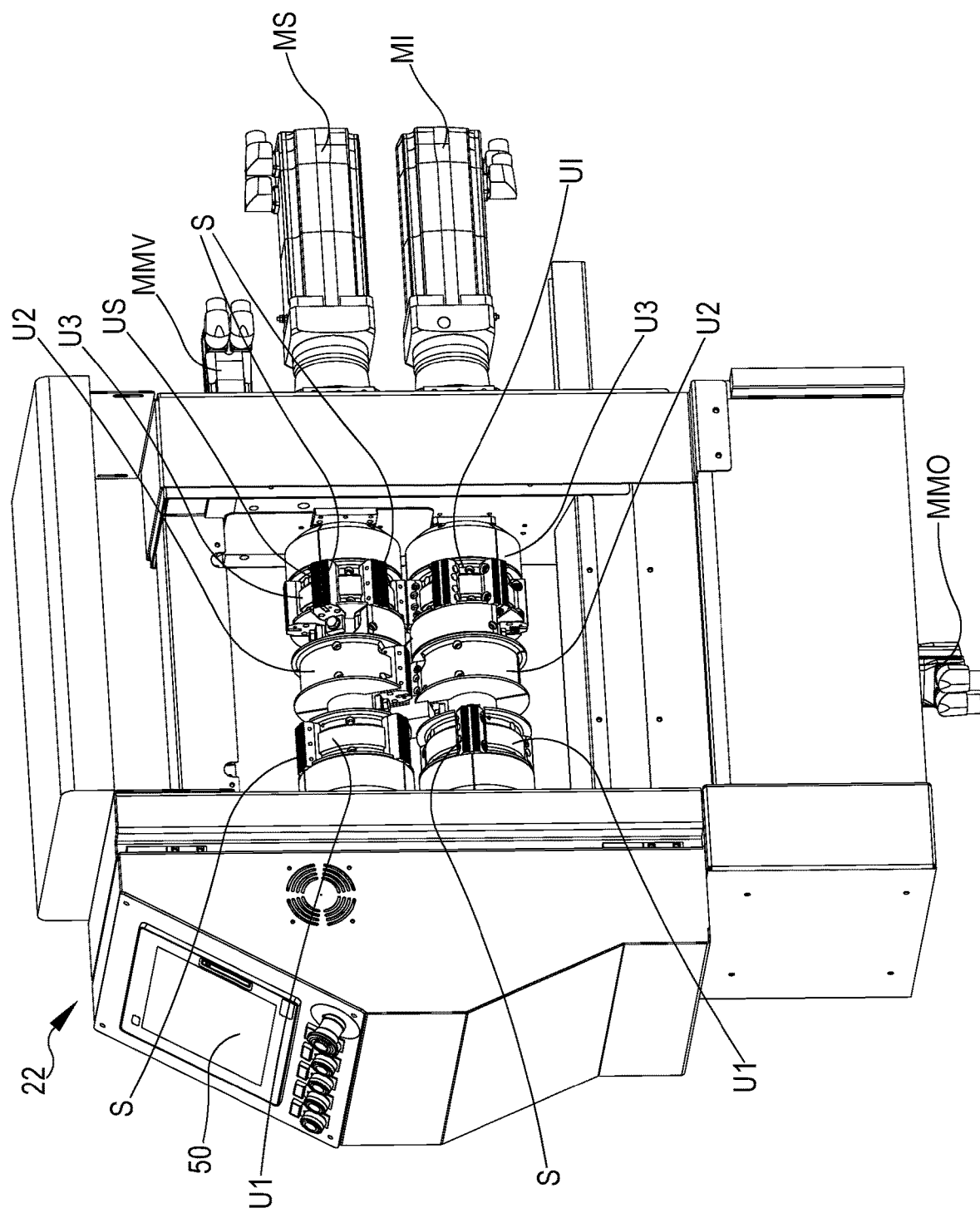
FIG. 16 shows a view of the support structure of a cut-sew group according to the present invention.
Figure 17:
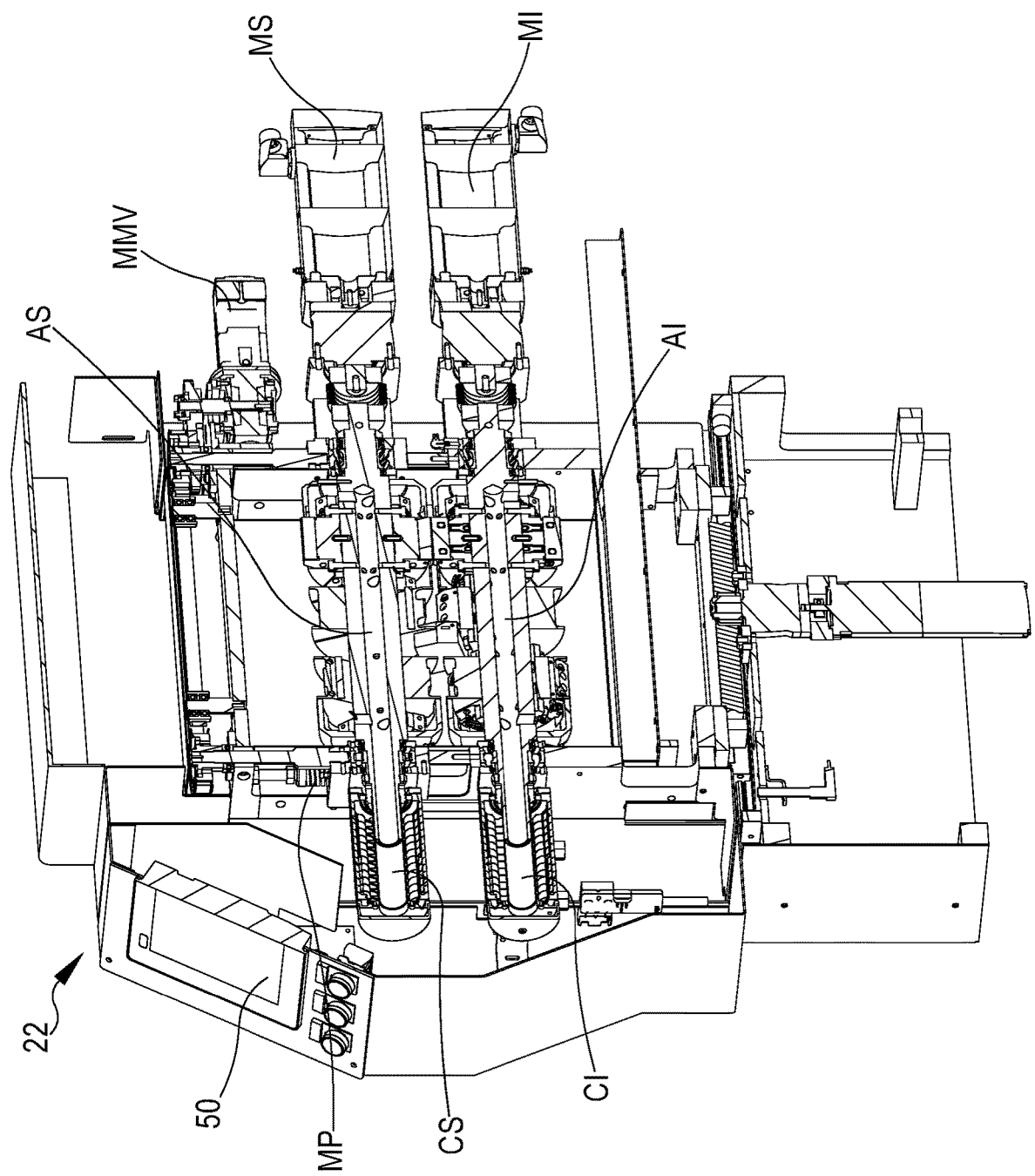
FIG. 17 shows a cross-section view of the support structure of the cut-sew group in FIG. 16.
Figure 18:
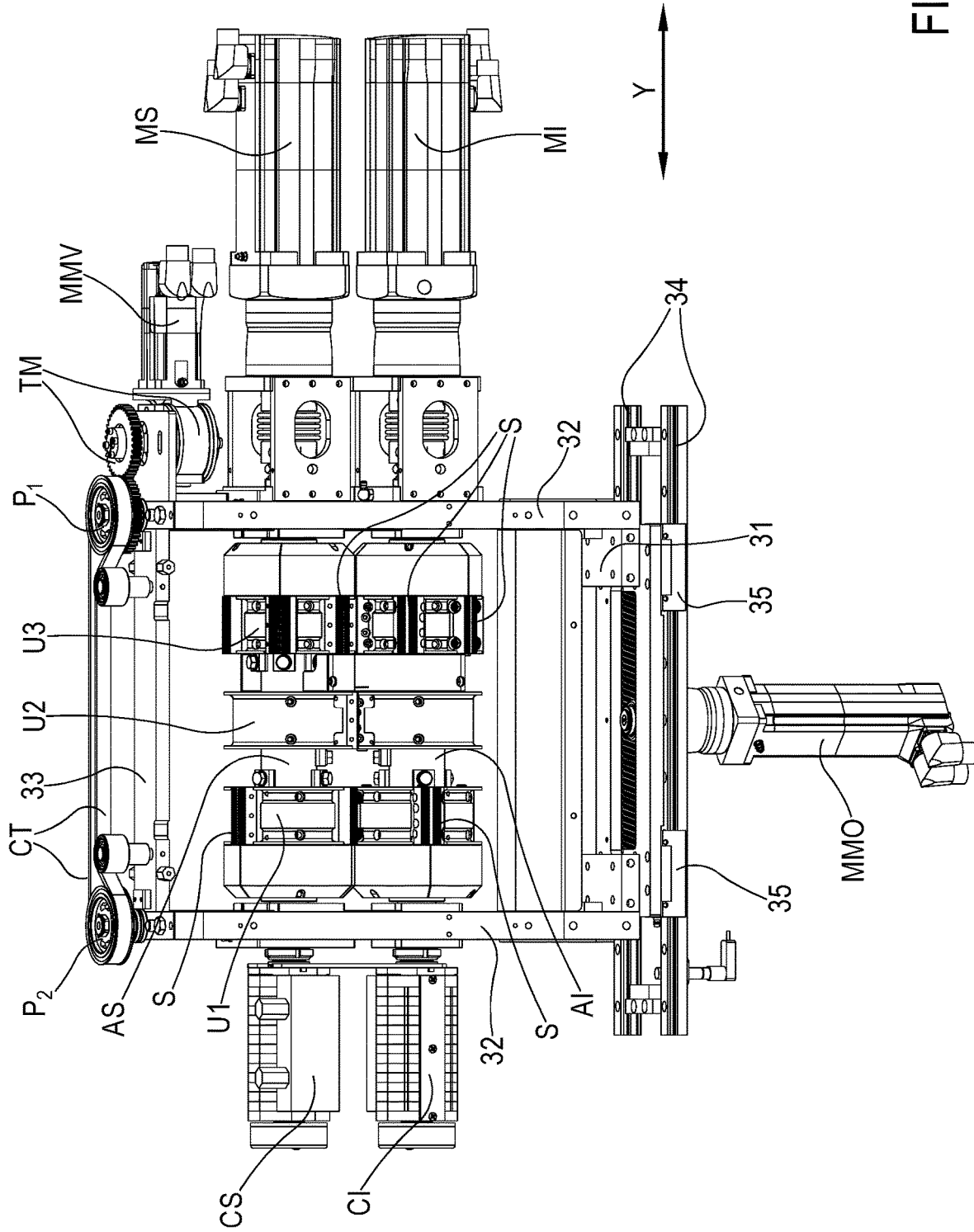
FIGS. 18 and 19 show perspective views of the support structure of cut-sew group in FIG. 16.
Figure 19:
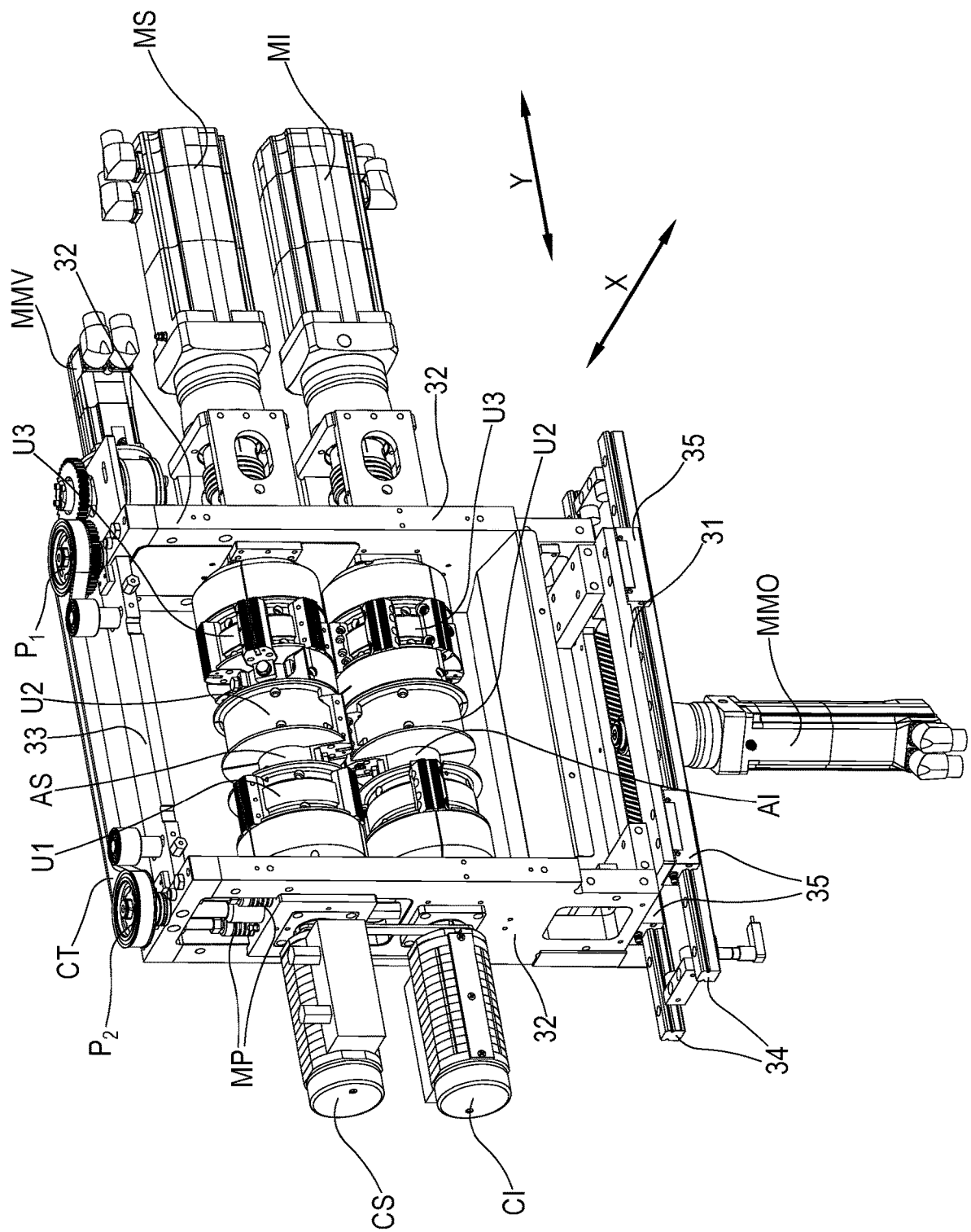
Figure 20:
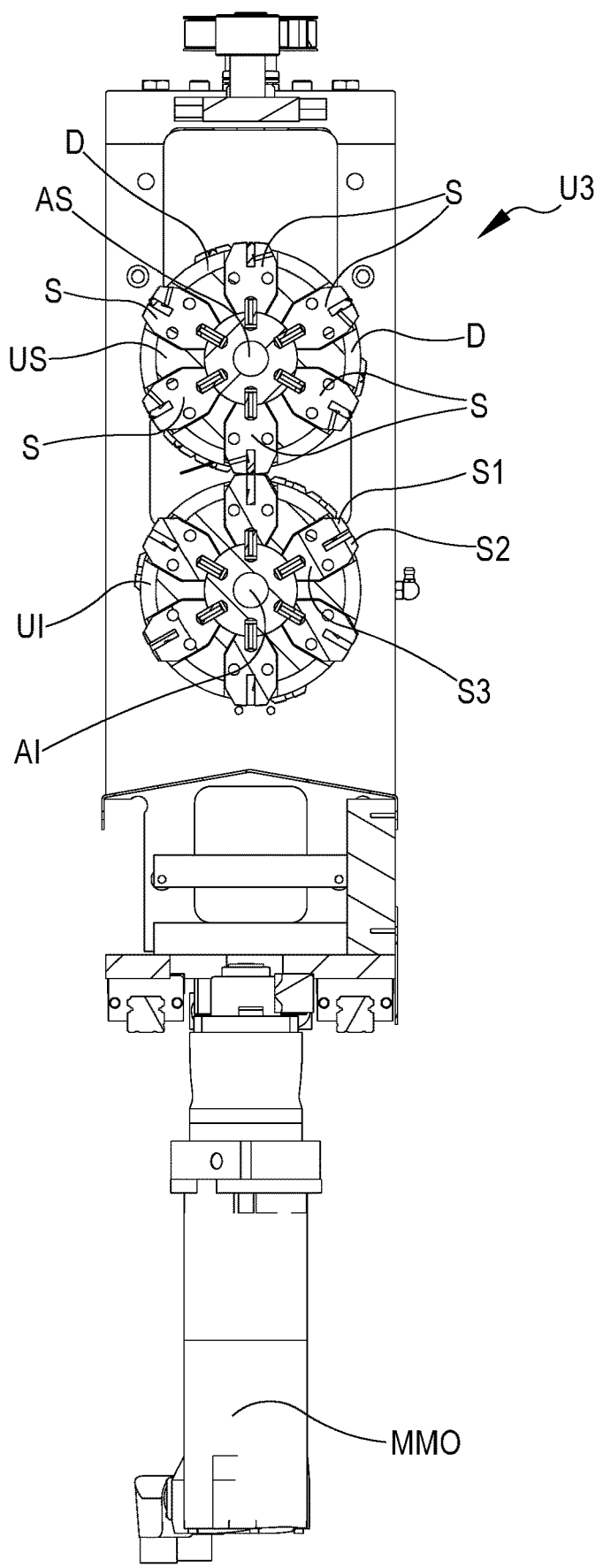
FIGS. 20-22 show side cross-section views of the three tools of the cut-sew group according to the present invention which illustrate configurations of the heat-sealing spatulas for each tool.
Figure 22:
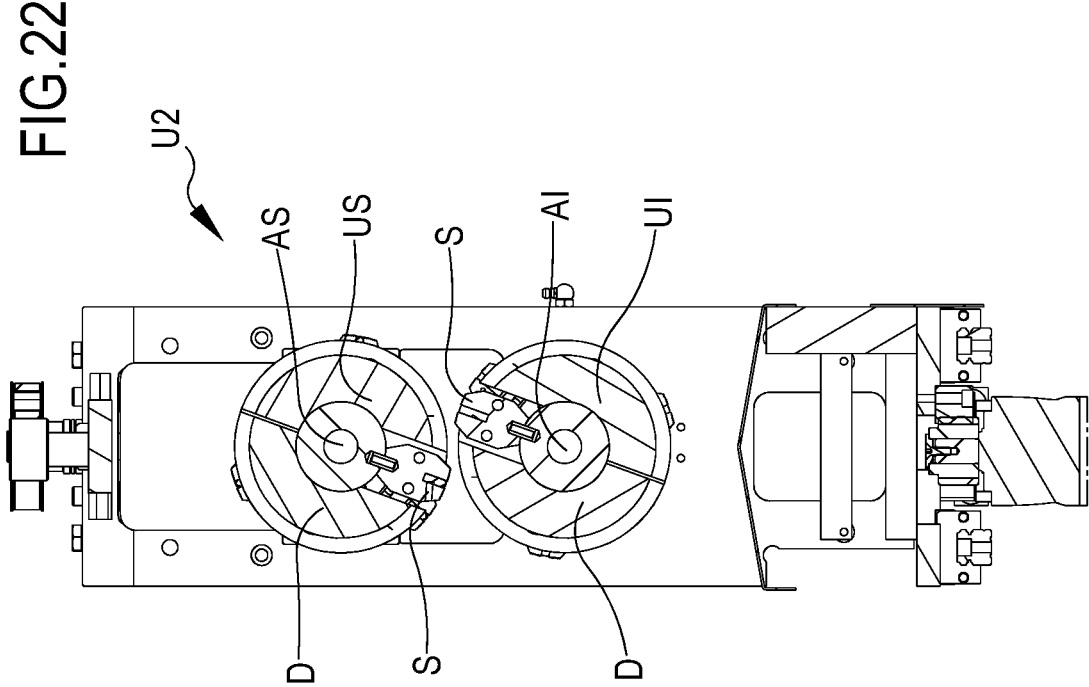
Figure 21:
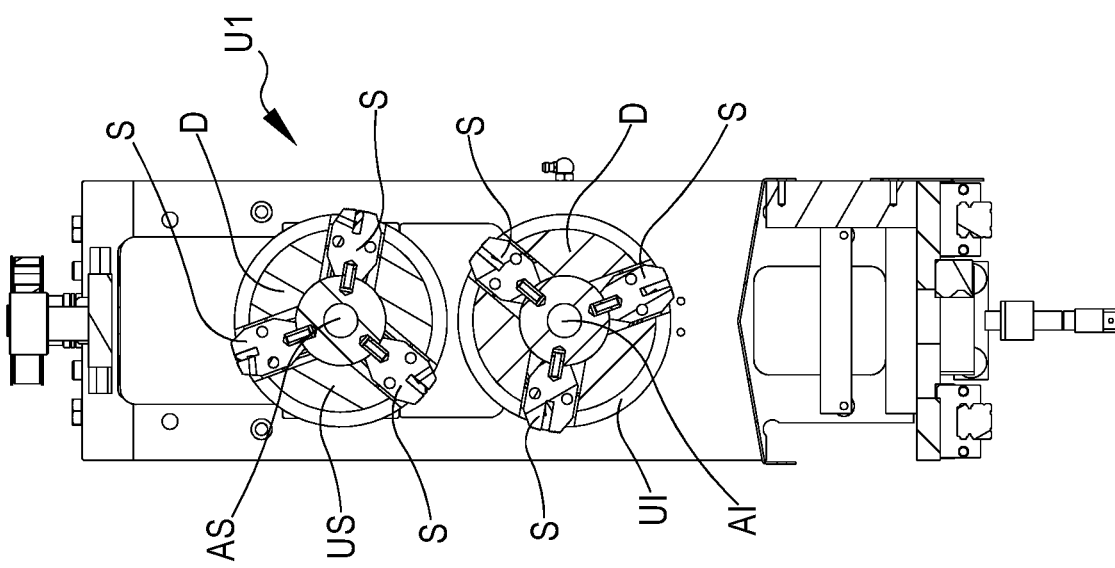
Figure 23:
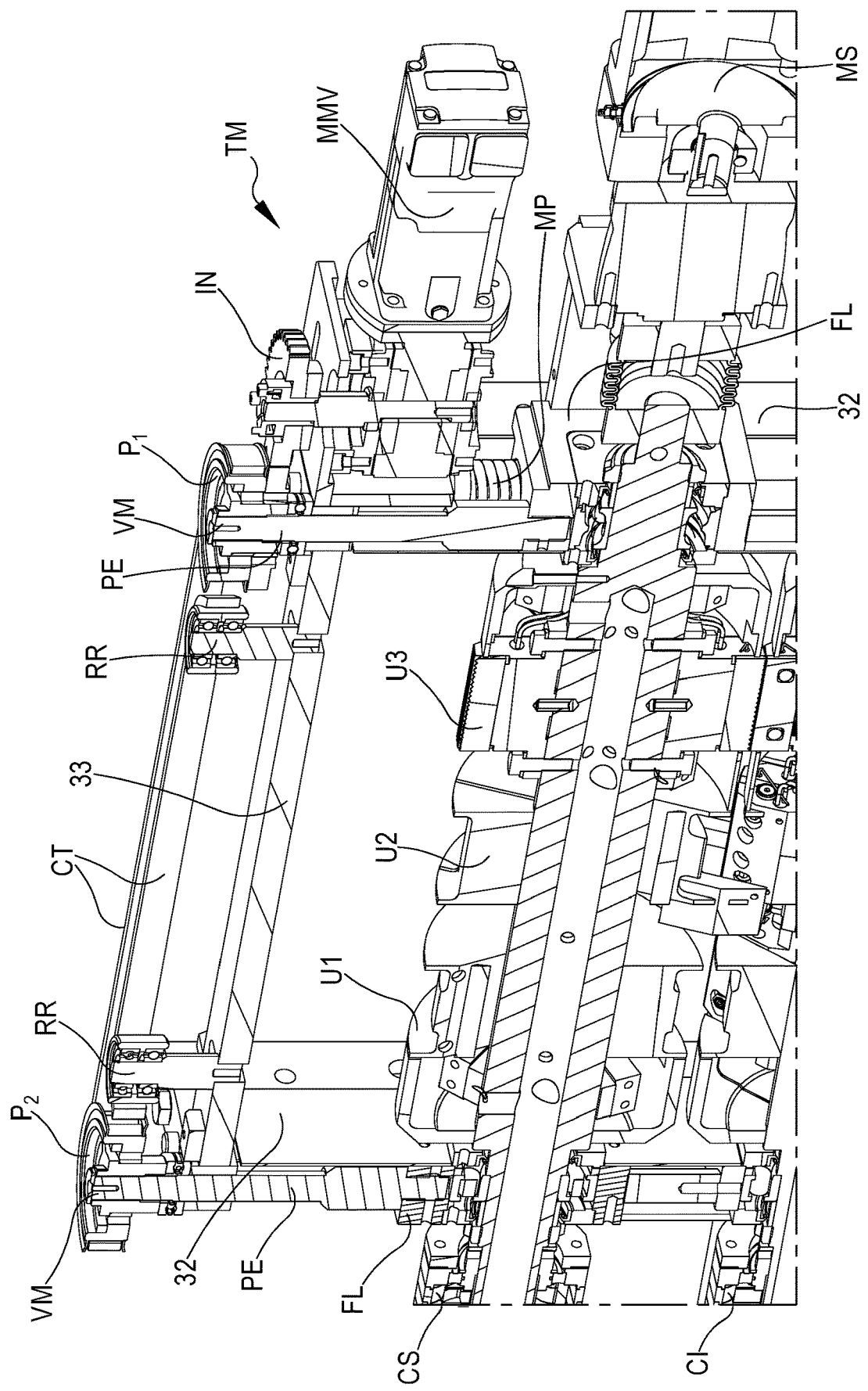
FIGS. 23-26 show cross-section views of the horizontal packaging machine of FIG. 12, in which the cut-sew group according to the present invention is visible, and in particular, the compensation means of the mutual distance between the two shafts with micrometric adjustment to compensate for thermal expansion.
Figure 24:
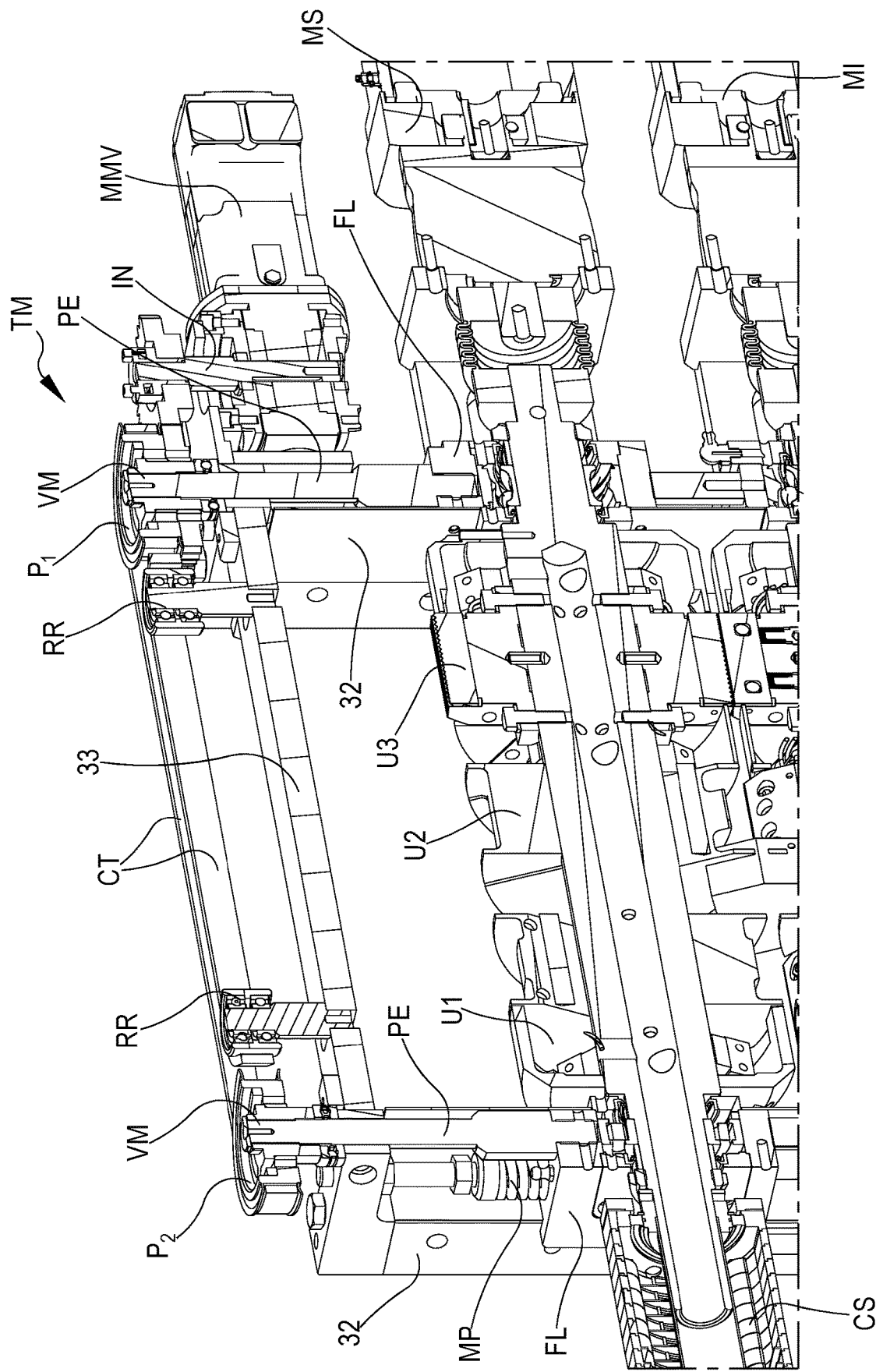
Figure 25:
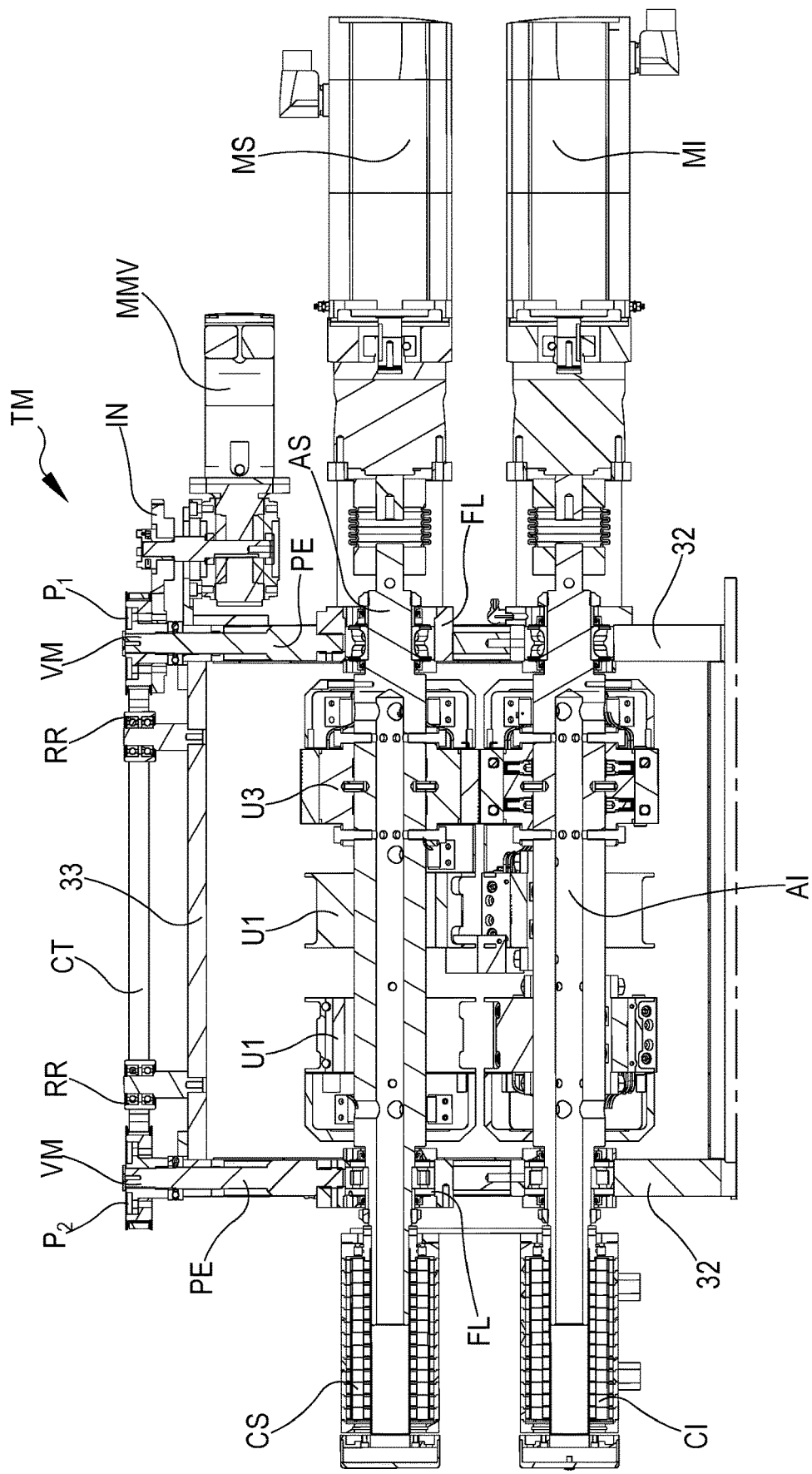
Figure 26:
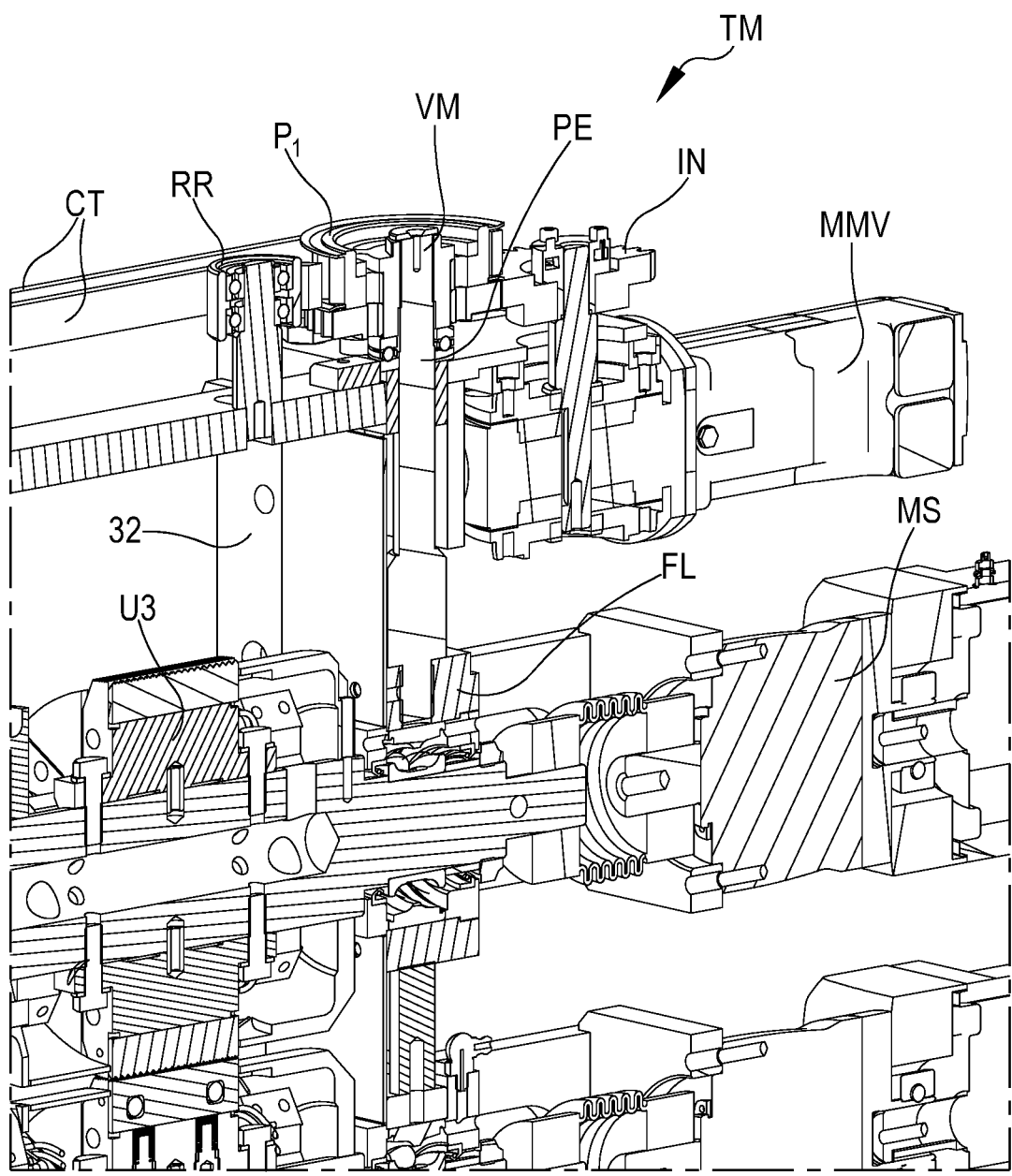

FIG. 14 shows the structure of the cut-sew group 22. In particular, the two upper rotating shafts AS and the lower rotating shafts AI are fitted on a carriage or slide 30 which allows a movement in the direction Y indicated by the arrow. The carriage 30 comprises a support base 31 fitted on two guide rails 34, two uprights 32, and an upper closure portion 33.

The two guide rails 34 extend transversely relative to the product advancement direction X. The support base 31 fits recirculating ball bearing slides 35 (two slides for each rail rod 34) and there is a movement gear driven by a horizontal movement motor MMO.

The upper shaft AS is driven in rotation by an upper motor MS and the lower shaft AI is driven in rotation by a lower motor MI. The shafts AS and AI are directly engaged on the rotational axes of the respective motor.

The accuracy of the contact between a spatula S of the upper tool US and a spatula of the lower tool UI is ensured by the motors which move the upper AS and lower AI rotary shafts.

The electrified collectors CS and CI are mounted on the side opposite to the motors MS and MI.

With reference to FIGS. 23-26, there is a transmission belt CT in the upper portion of the carriage 30 which turns two pins PE to achieve height adjustment of the upper shaft AS relative to the lower shaft AI. This is a micrometer adjustment which is used to adjust the welding and cutting pressure. It is used to make the spatulas S of the upper and lower tools touch.

The upper shaft AS is held in place by springs MP on which a preload of about 300 kg/400 kg weighs. This generates an automatic pressure system to hold the upper shaft AS in place. The preload springs MP are used to make the upper shaft AS elastic if something should get stuck between the upper and lower tools.

According to the main technical feature of the invention, therefore, in the horizontal packaging machine M there are means for compensating the mutual distance between the two shafts AS and AI with micrometric adjustment to compensate for thermal expansion and to be able to use packaging films of different thicknesses.

In the upper part of the carriage 30, there is a small electric motor MMV that through a mechanical transmission TM turns a first pulley P1, which through the belt CT turns a second driven pulley P2 and by virtue of a worm screw moves the upper shaft AS, which carries the upper cut-sew tools US, either up or down. The upper shaft AS is movable micrometrically either up or down, as needed. The upper shaft AS moves parallel relative to the lower shaft AI (so that the two rotation axes remain mutually parallel). The transmission TM is adjusted using operating screws VM.

Therefore, the mutual distance compensation means of the two shafts AS and AI comprise a motor MMV with gearmotor, a pair of gears IN integral with the first pulley P1, a transmission belt CT tensioned by means of return wheels RR and a second driven pulley P2. The movement is transmitted by two operating screws which tighten and loosen the pins PE attached to the upper shaft AS. In particular, the pins PE are threaded in their upper end portion (with reference to the figures) which is received in threaded bushings within pulleys P1 and P2. The pins PE are mounted between the springs MP.

The upper shaft AS is mounted on two flanges FL slidingly mounted vertically on the uprights 32 of the carriage 30. In particular, the flanges FL are integrally connected to the pins PE and allow the vertical displacement of the upper shaft AS relative to the lower shaft AI by acting on the operating screws VM.

The flanges FL are blocks provided with guide means for sliding, wherein said guide means are, for instance, sliding pads made of brass or low-friction material.

The pitch between two subsequent cut and sew tools is 100 mm and the maximum stroke in the case of three cut and sew tools is 200 mm. Therefore, as a function of these dimensions, it is possible to increase the footprint of the new cut and sew group 22 inside the machine M itself.

In particular manner, the width of the horizontal packaging machine M remains the same and slightly increases the projection of the cut-sew group from the operator side.

For positioning the correct tool to be used, a motor MMO is present which moves the entire cut-sew group 100 mm to the left or right of its initial position. Therefore it is possible to choose between three different tools with just one displacement of 100 mm in either direction.

Thus, the cut-sew group 22 comprises at least four motors: one for each of the shafts MS and MI, one for the vertical displacement MMV of the upper shaft AS, and one for the horizontal translation MMO of the cut-sew group 22.

In the final machine, there is a safety guard which closes off the entire area of the welding group 20.

To maintain the same overall dimensions compared to the known machines in the new machine, the electrical collectors CS and CI are moved to the side opposite to the one on which the motors MS and MI are mounted.

The electrical collectors CS and CI are longer because they must have diversified control for different tools. The portion of the machine of the invention which houses the electrical collectors CS and CI is called the casing.

The electrical collectors CS and CI are connected to an electrical control panel 50 using appropriate wiring.

In the new machine suggested here, the connection cables follow a different path from the known machines and therefore the entire cut-sew group 22 has been modified.

The packaging film F advances and the shafts of the cut-sew group 22 rotate at a speed of 208 revolutions per minute for the tools which mount six spatulas making 1,250 packs per minute.

Of course, when the size to be produced changes, so does the speed of rotation of the shafts of the cut-sew group 22.

The rotation speed of the shafts of the cut-sew group 22 varies according to the number of spatulas mounted on the tools in use and the number of packs per minute to be obtained.

The two shafts AS and AI of the cut-sew group 22 rotate synchronously but in opposite directions of rotation.

Once formed, the packs arrive on a conveyor belt which sends them to a packaging machine or are collected in storage boxes.

By virtue of the aforesaid description, it is thus apparent that the horizontal packaging machine and cut-sew group of the present invention achieves the purposes and reaches the advantages mentioned above.

Therefore, the machine according to the present invention provides an automatic tool change of the cut-sew group with a solution which does not require downtime, machines stops, and a skilled operator. Furthermore, the solution suggested here does not particularly modify the total machine footprint, guaranteeing the machine a high degree of flexibility to obtain packs of different sizes with a single packaging machine.

Of course, notwithstanding the principle of the invention, the details of construction and embodiments may vary widely relative to what is described and illustrated purely by way of example, without because of this departing from the scope of the present invention.

Where the constructive features and techniques mentioned in any successive claims are followed by references signs or numerals, such reference signs were introduced for the sole purpose of increasing intelligibility of the claims themselves and consequently, such reference signs have no limiting effect on the interpretation of each element identified by way of example only by such reference signs.

The invention claimed is:

1. A horizontal packaging machine for packaging a product fed in a horizontal direction comprising a cut-sew group suitable to make on a packaging film transverse welds and a cut to close and separate each other two successive packs, wherein said cut-sew group comprises a plurality of cut and sew tools suitable to make said transverse welds and said cut, wherein said transverse welds define the edges of the packs according to different packaging sizes for said product, wherein said cut-sew group comprises an upper shaft and a lower shaft driven in rotation independently by means of a respective upper motor and a respective lower motor, in which each shaft mounts on it said plurality of cut and sew tools and in which each cut and sew tool is composed of an upper tool having a spatula and a corresponding lower tool having a spatula, further comprising compensation means of the mutual distance between the two shafts with micrometric adjustment of said distance to compensate for thermal expansion and use of packaging film of different thickness, said micrometer adjustment being used to adjust the welding and cutting pressure and to make said spatulas of said upper and lower tools touch, wherein said mutual distance compensation means comprise an electric motor which through a mechanical transmission rotates a first pulley which, through a transmission belt, rotates a second driven pulley and moves the upper shaft carrying the upper cut and sew tools.

2. The horizontal packaging machine according to claim 1, wherein said mutual distance compensation means comprise two pins to obtain a height adjustment of the upper shaft with respect to the lower shaft, wherein said pins are integral with the upper shaft and are threaded in their end portion opposite that one where they are connected to the upper shaft and wherein said opposite end portion of the pins is received in threaded bushings housed inside the first pully and the second driven pully.

3. The horizontal packaging machine according to claim 2, wherein said mutual distance compensation means allow by means of operating screws the micrometric displacement of the upper shaft in such a way that the two rotation axes of the upper and lower shafts remain parallel each other.

4. The horizontal packaging machine according to claim 3, wherein said mutual distance compensation means comprise a gearmotor connected to said motor, wherein said motor is connected to a pair of gears integral with the first pulley, said transmission belt is tensioned by means of return wheels and the movement is transmitted by acting on the operating screws that screw and unscrew the pins integral with the upper shaft.

5. The horizontal packaging machine according to claim 2, wherein said cut-sew group is mounted on a carriage or chassis which allows a displacement of said cut-sew group in a direction transversal with respect to the horizontal feed direction of the product, wherein said carriage comprises a structure having a support base, two uprights and an upper closing portion, wherein between said two uprights of said carriage said upper shaft and said lower shaft are mounted and wherein said mutual distance compensation means comprise two flanges slidingly vertically mounted on the uprights of the carriage.

6. The horizontal packaging machine according to claim 5, wherein said flanges are connected in an integral way to the pins and allow the vertical movement of the upper shaft with respect to the lower shaft.

7. The horizontal packaging machine according to claim 6, wherein said flanges are equipped with guide means for the vertical sliding.

8. The horizontal packaging machine according to claim 7, wherein said upper shaft is held in position by an automatic pressure system formed by preload springs.

9. A cut-sew group to make transverse welds on a packaging film and a cut to close and separate two successive packs, wherein said cut-sew group comprises a plurality of cut and sew tools suitable to make said transverse welds and said cut, wherein said transverse welds define the edges of the packs according to different packaging sizes for said product, wherein said cut-sew group comprises an upper shaft and a lower shaft independently controlled in rotation by means of a respective upper motor and a respective lower motor, wherein each shaft mounts on it said plurality of cut and sew tools and wherein each cut and sew tool is composed of an upper tool having a spatula and a corresponding lower tool having a spatula, further comprising a compensation means of the mutual distance between the two shafts with micrometric adjustment of said distance to compensate for thermal expansion and in order to use packaging film of different thickness, said micrometer adjustment being used to adjust the welding and cutting pressure and to make said spatulas of said upper and lower tools touch, wherein said mutual distance compensation means comprise an electric motor which through a mechanical transmission rotates a first pulley which through a transmission belt rotates a second driven pulley and moves the upper shaft carrying the upper cut and sew tools.

10. The cut-sew group according to claim 9, wherein said mutual distance compensation means comprise two pins to obtain a height adjustment of the upper shaft with respect to the lower shaft, wherein said pins are integral with the upper shaft and are threaded in their end portion opposite that one in which they are connected to the upper shaft and wherein said opposite end portion of the pins is received in threaded bushings housed inside the pulleys.

11. The cut-sew group according to claim 10, wherein said mutual distance compensation means comprise a gearmotor connected to said motor, wherein said motor is connected to a pair of gears integral with the first pulley, said transmission belt is tensioned by means of return wheels and the movement is transmitted by acting on the operating screws which screw and unscrew the pins integral with the upper shaft.

12. The cut-sew group according to claim 11, wherein said mutual distance compensation means allow by means of operating screws the micrometric movement of the upper shaft in such a way that the two rotation axes of the upper and lower shafts remain parallel each other.

13. The cut-sew group according to claim 12, comprising a carriage or slide which allows a displacement of said cut-sew group in a direction transversal with respect to the horizontal feed direction of the product, wherein said carriage comprises a structure having a support base, two uprights and an upper closing portion, wherein said upper shaft and said lower shaft are mounted between said two uprights of said carriage and wherein said mutual distance compensation means comprise two flanges slidingly vertically mounted on the uprights of the carriage.

14. The cut-sew group according to claim 13, wherein said flanges are connected integrally to the pins and allow the vertical displacement of the upper shaft with respect to the lower shaft.

15. The cut-sew group according to claim 14, wherein said flanges are equipped with guide means for the vertical sliding.

16. The cut-sew group according to claim 15, where said upper shaft is held in position by an automatic pressure system formed by preload springs.

17. The cut-sew group according to claim 13, wherein said flanges are equipped with guide means for the vertical sliding.

18. The cut-sew group according to claim 9, wherein said upper shaft is held in position by an automatic pressure system formed by preload springs.

\* \* \* \* \*